United States Patent [19]

Akimoto et al.

[11] Patent Number: 4,827,341
[45] Date of Patent: May 2, 1989

[54] SYNCHRONIZING SIGNAL GENERATING CIRCUIT

[75] Inventors: Taizo Akimoto; Mikio Nishiyama; Yoshiyuki Yazawa; Hirohumi Ohnishi, all of Minami-Ashigara, Japan

[73] Assignee: Fuji Photo Equipment Co., Ltd., Kanagawa, Japan

[21] Appl. No.: 133,971

[22] Filed: Dec. 16, 1987

[30] Foreign Application Priority Data

Dec. 16, 1986 [JP] Japan ................................ 61-299143
Dec. 16, 1986 [JP] Japan ................................ 61-299144
Jan. 30, 1987 [JP] Japan ................................ 62-19954

[51] Int. Cl.$^4$ .......................... H04N 5/04; H04N 5/08
[52] U.S. Cl. ..................................... 358/148; 358/153; 358/158
[58] Field of Search ............... 358/148, 149, 150, 153, 358/154, 158, 160

[56] References Cited

U.S. PATENT DOCUMENTS 4,364,091 12/1982 Taguchi et al. ..................... 358/148
4,701,800 10/1987 Akimoto et al. ..................... 358/244
4,709,268 11/1987 Akimoto et al. ..................... 358/150

FOREIGN PATENT DOCUMENTS 218406 4/1987 European Pat. Off. .
57-180282 11/1982 Japan .
62-77770 4/1987 Japan .

Primary Examiner—James J. Groody
Assistant Examiner—Michael D. Parker
Attorney, Agent, or Firm—Sughrue, Mion, Zinn, Macpeak & Seas

[57] ABSTRACT

A synchronizing signal generating circuit is incorporated in a digital image storing device. When a plurality of video signals composed of different numbers of scanning lines and issued from television cameras of different types of various diagnostic apparatus are converted from analog to digital signals and stored per frame in an image memory in the digital image storing apparatus, sampling pulses for an A/D converter which are synchronous with the horizontal synchronizing signals of the video signals and field discriminating signals relative to odd-numbered fields and even-numbered fields, among composite synchronizing signals, are generated by using an N-multiplier including an equalizing pulse remover controlled by an F/V converter and a field discriminating circuit with a field discriminating time constant being automatically controlled by the F/V converter. The video signals are stored per frame in the image memory on a real-time basis by utilizing the sampling pulses and the field discriminating signal.

9 Claims, 27 Drawing Sheets

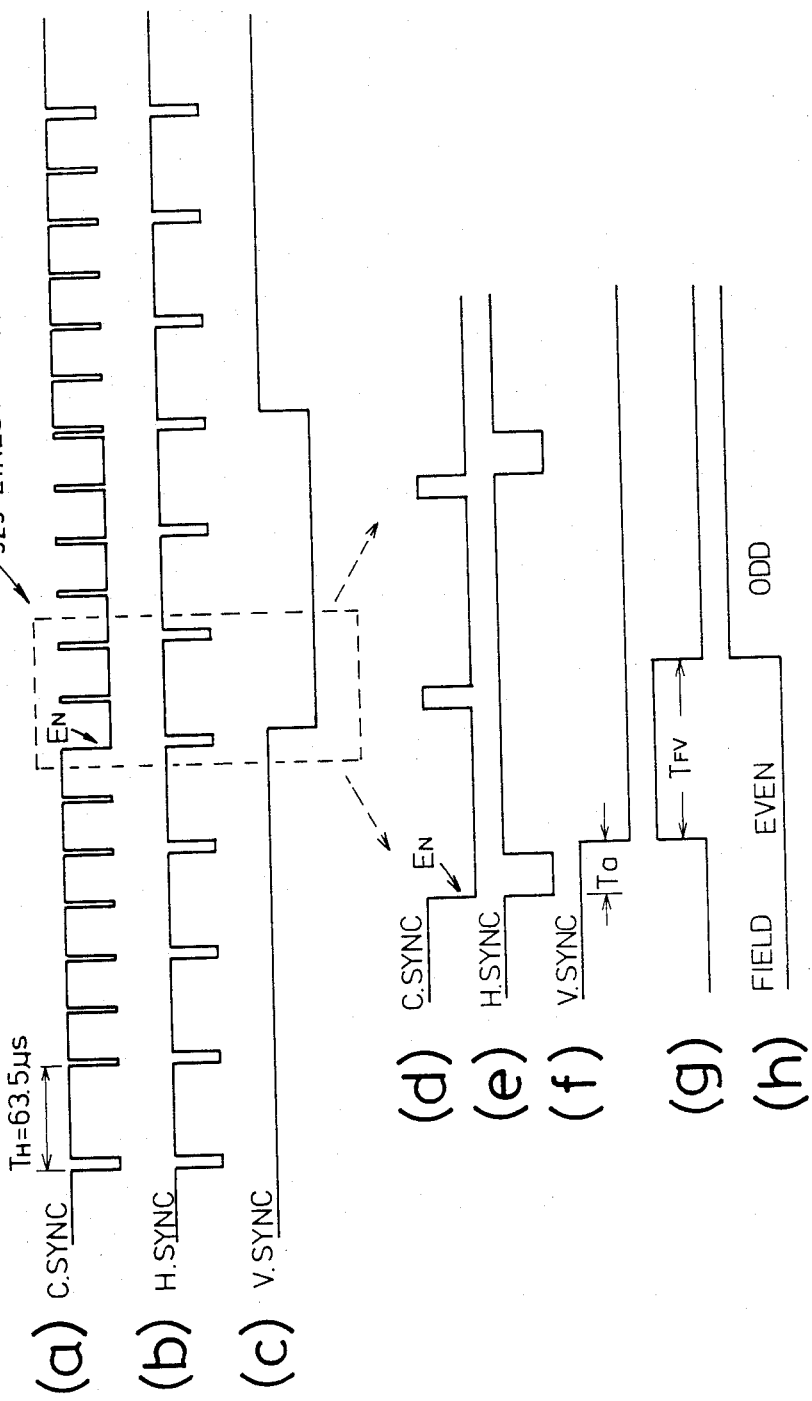

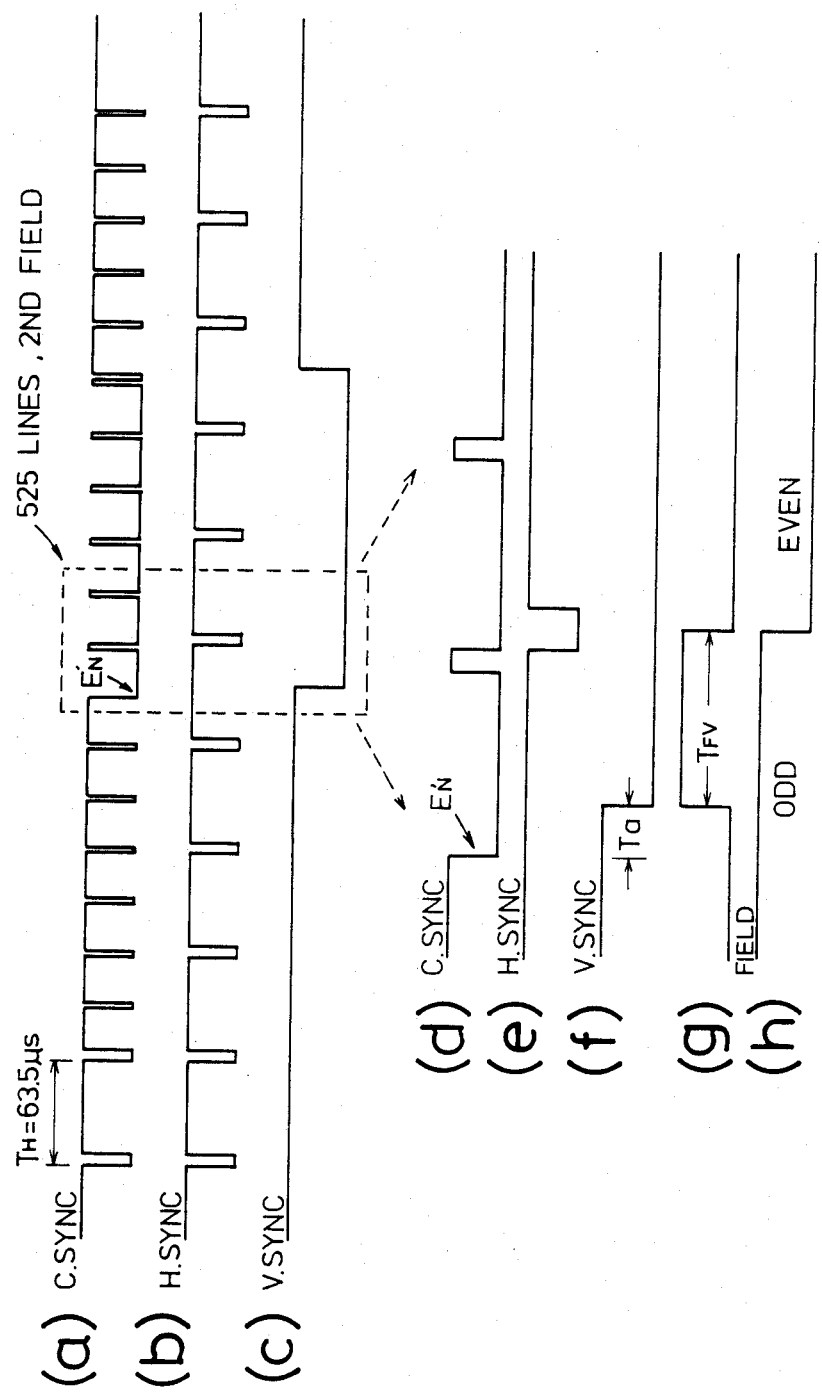

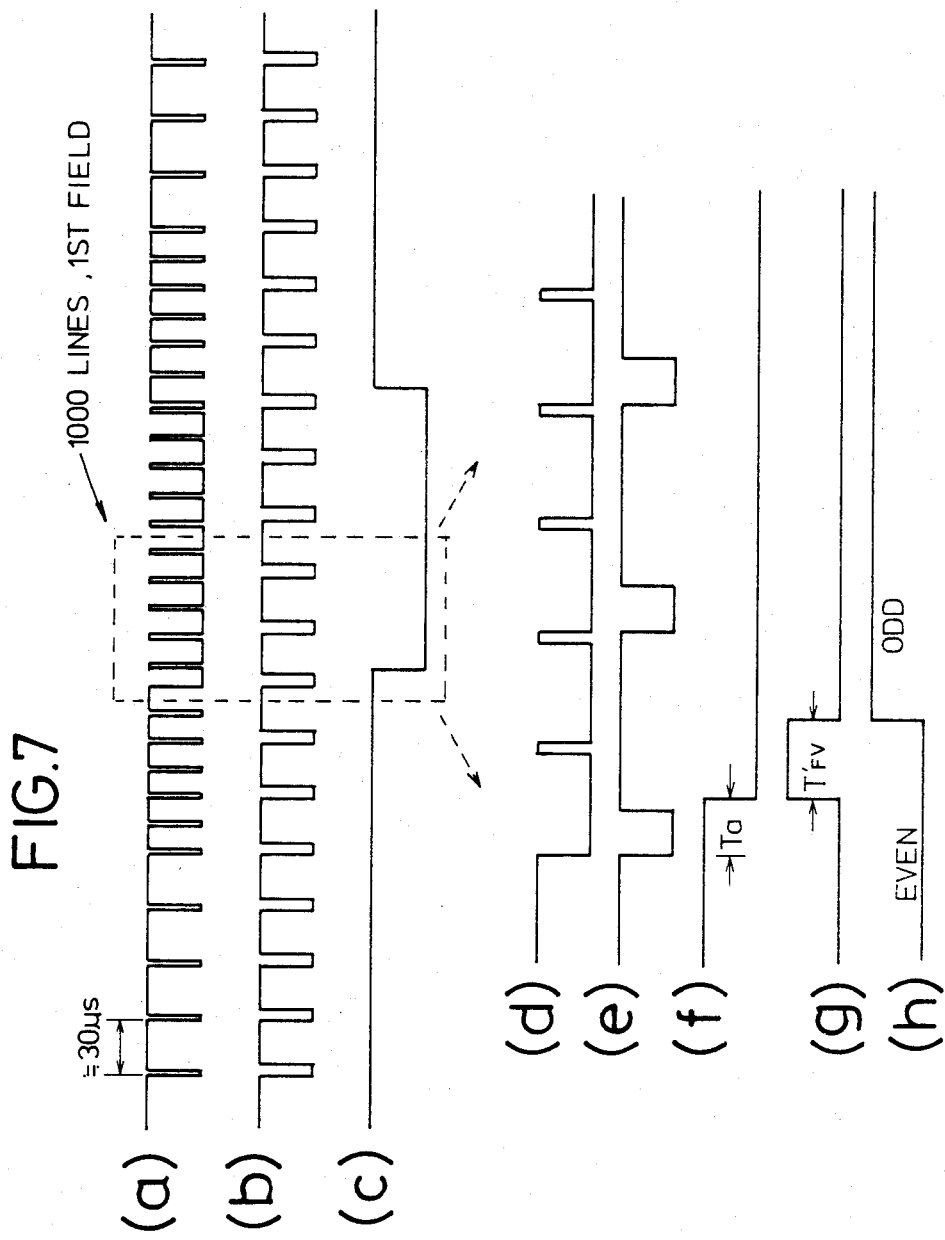

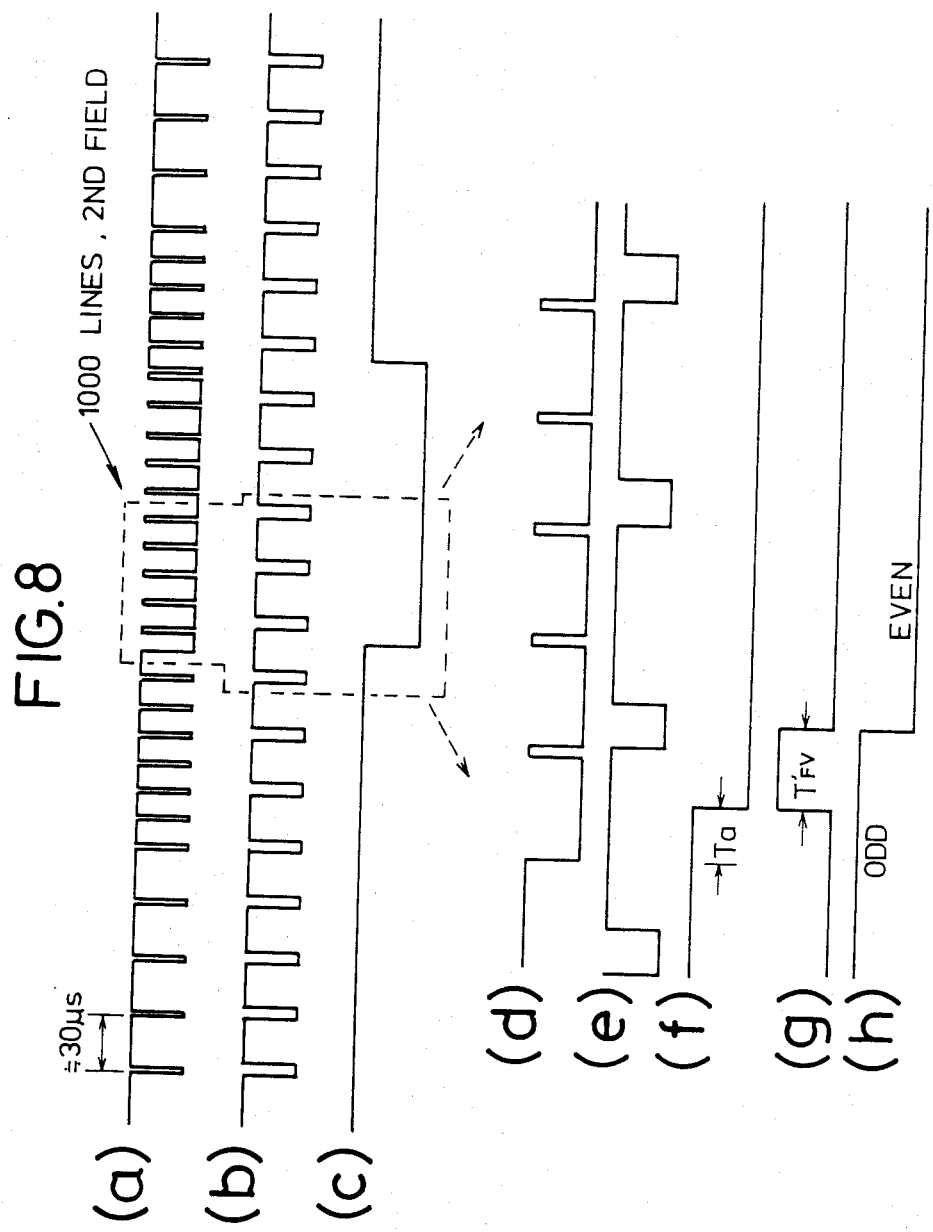

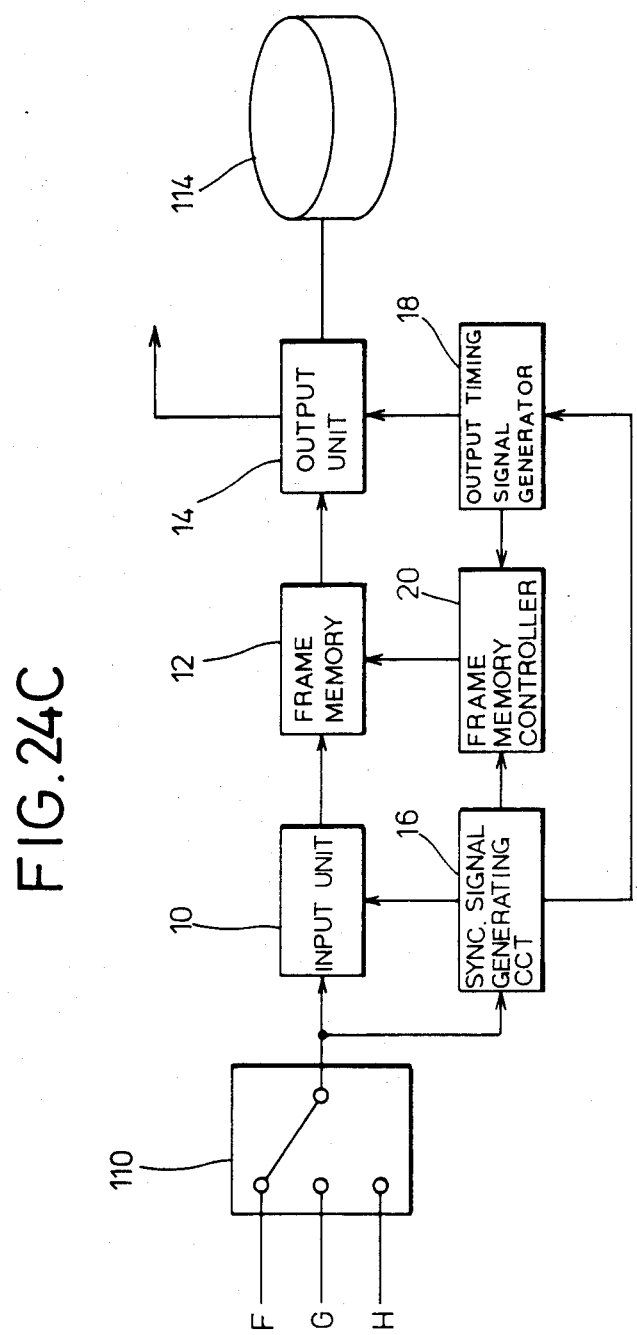

SYNCHRONIZING SIGNAL GENERATING CIRCUIT

BACKGROUND OF THE INVENTION

The present invention relates to a circuit for generating synchronizing signals such as sampling pulses or address signals used when video signals from a plurality of diagnostic apparatus such as CT (computerized tomographic) imaging systems and US (ultrasonographic) imaging systems are recorded in digital image storing apparatus, and more particularly to a synchronizing signal generating circuit for being incorporated in a digital image storing device, wherein when a plurality of video signals composed of different numbers of scanning lines and issued from imaging devices (such as television cameras) of different types of various diagnostic apparatus are cnverted from analog to digital signals and stored in an image memory in the digital image storing apparatus, sampling pulses synchronous with the horizontal synchronizing signals of the video signals and field discriminating signals are generated by using an N-multiplying circuit controlled by a frequency-to-voltage (F/V) converter and a field discriminating circuit controlled by the F/V converter, and the video signals are recorded orderly per frame in the image memory on a real-time basis by utilizing the sampling pulses and the field discriminating signal.

Images thus stored may be employed in signal sources for various image recording apparatus such as multiformat cameras, laser printers, thermal printers, ink jet printers, and the like, in input sources for simple PACSs (picture achieving and communication systems) as analog sources, in primary image storage systems for X-ray television or cinematographic systems, and in image buffers to which the principles of image memories are applied or scan converters, etc.

Continuous image information obtained by CT, US or the like of an affected part of a human body and a surrounding area, for example, is very useful to doctors since it gives visual indications of the affected part and its surrounding area. If a plurality of pieces of such image information are recorded on photographic films, for example, for use as hard copies, then they can readily be used for medical diagnosis without time and space limitations.

However, video signals produced by the various medical image diagnostic apparatus of the type referred to above may not necessarily be of identical specifications or formats, but are likely to differ from diagnostic apparatus to diagnostic apparatus with regard to the number of scanning lines, field frequencies, and other aspects.

In order to store video images composed of different numbers of scanning lines in the image memory of a digital image storing apparatus, it has been necessary to employ a sampling signal generating circuit for generating a number of sampling signals suited to and synchronous with respective numbers of scanning lines and a plurality of image storing apparatus each having constants set for one of the video signals.

With the recent technical advance of medical diagnostic apparatus, there have been proposed many types of such medical diagnostic apparatus including, in addition to CT and US, DF (digital fluorographic) apparatus, MRI (magnetic resonance imaging) apparatus, RI (radioisotope) apparatus, and others. Therefore, if independent digital image storing apparatus designed for use respectively with these medical diagnostic apparatus were employed, the entire system would highly be costly and require a large installation space.

SUMMARY OF THE INVENTION

It is a general object of the present invention to provide a synchronizing signal generating circuit for being incorporated in a digital image storing device, wherein when a plurality of video signals composed of different numbers of scanning lines and issued from television cameras of different types of various diagnostic apparatus are converted from analog to digital signals and stored per frame in an image memory in the digital image storing apparatus, sampling pulses for an A/D converter which are synchronous with the horizontal synchronizing signals of the video signals and field discriminating signals relative to odd-numbered fields and even-numbered fields, among composite synchronizing signals, are generated by using an N-multiplying circuit including an equalizing pulse remover controlled by an F/V converter and a field discriminating circuit with a field discriminating time constant being automatically controlled by the F/V converter, and the video signals are stored per frame in the image memory on a real-time basis by utilizing the sampling pulses and the field discriminating signal.

Another object of the present invention is to provide a synchronizing signal generating circuit comprising: equalizing pulse remover means for receiving a composite synchronizing signal as an input signal, the equalizing pulse remover means being adapted to be coupled to a reference input terminal of a frequency synthesizer; and an F/V converter for controlling the equalizing pulse remover means, the F/V converter being receptive of the composite synchronizing signal as an input signal.

Still another object of the present invention is to provide a synchronizing signal generating circuit, wherein the F/V converter receives a video synchronizing signal as the input signal and comprises a pulse shaper and a low-pass filter connected thereto, the equalizing pulse remover means being controlled by an output signal from the low-pass filter.

Yet still another object of the present invention is to provide a synchronizing signal generating circuit comprising equalizing pulse remover means for receiving a composite synchronizing signal as an input signal, the equalizing pulse remover means being adapted to be coupled to a reference input terminal of a frequency synthesizer including at least a prescaler; and an F/V converter for producing as an output signal thereof a control signal for controlling the equalizing pulse remover means, the F/V converter being receptive of the composite synchronizing signal as an input signal.

A further object of the present invention is to provide a synchronizing signal generating circuit, wherein the F/V converter comprises a pulse shaper and a low-pass filter connected thereto, the equalizing pulse remover means and/or the prescaler being controlled by an output signal from the low-pass filter.

A yet further object of the present invention is to provide a synchronizing signal generating circuit comprising: a field discriminating circuit for deriving a field discriminating signal from a composite synchronizing signal relative to a plurality of composite video signals having different numbers of scanning lines and produced from different video output devices; an F/V converter; an equalizing pulse remover and a vertical synchronizing signal separator which are controlled by the F/V converter, the F/V converter, the equalizing pulse remover, and the vertical synchronizing signal separator being receptive of the composite synchronizing signal; and a field detector including at least one delay flip-flop means and having a data input terminal connected to an output terminal of the equalizing pulse remover, a trigger input terminal connected to an output terminal of the vertical synchronizing signal separator, and a time constant control terminal connected to an output terminal of the F/V converter; the field discriminating circuit being arranged such that at a time or during a time period upon elapse of a time period from a prescribed leading edge of a rectangular-wave output signal from the vertical synchronizing signal separator, the field detector determines the binary level of an output signal applied by the equalizing pulse remover to the data input terminal for deriving the field discriminating signal of either a high level or a low level.

A still further object of the present invention is to provide a synchronizing signal generating circuit, wherein the field detector substantially comprises monostable multivibrator means and D-type flip-flop means, the monostable multivibrator means having a trigger input terminal supplied with an output signal from the vertical synchronizing signal separator, a time constant control terminal supplied with an output signal from the F/V converter, and an output terminal connected to a clock input terminal of the D-type flip-flop means, the D-type flip-flop means having a data input terminal supplied with an output signal from the equalizing pulse remover for deriving an output signal from the D-type flip-flop means as the field discriminating signal It is also an object of the present invention to provide a synchronizing signal generating circuit, wherein the field detector comprises first monostable multivibrator means, second monostable multivibrator means, D-type flip-flop means, and negative logic AND gate means, the first monostable multivibrator means having a trigger input terminal supplied with an output signal from the vertical synchronizing signal separator, a time constant control terminal supplied with an output signal from the F/V converter, and an output terminal for applying an output signal to a trigger input terminal of the second monostable multivibrator means, the second monostable multivibrator means having an output terminal for applying a positive output signal to a clock input terminal of the D-type flip-flop means and another output terminal for applying a negative output signal to one input terminal of the negative logic AND gate means, the negative logic AND gate means having another input terminal supplied with an output signal from the equalizing pulse remover, and an output terminal for applying an output signal to a set input terminal of the D-type flip-flop means, the D-type flip-flop means having a data input terminal supplied with a negative output signal from the D-type flip-flop means as the field discriminating signal.

Another object of the present invention is to provide a synchronizing signal generating circuit comprising: a field discriminating circuit for deriving a field discriminating signal from a composite synchronizing signal relative to a plurality of composite video signals having different numbers of scanning lines and produced from different video output devices; a frequency synthesizer for multiplying a horizontal synchronizing signal based on the composite synchronizing signal; an F/V converter; an equalizing pulse remover and a vertical synchronizing signal separator which are controlled by the F/V converter, the F/V converter, the equalizing pulse remover, and the vertical synchronizing signal separator being receptive of the composite synchronizing signal; and a field detector including at least one delay flip-flop means and having a data input terminal connected to an output terminal of the equalizing pulse remover, a trigger input terminal connected to an output terminal of the vertical synchronizing signal separator, and a time constant control terminal connected to an output terminal of the F/V converter; the field discriminating circuit being arranged such that at a time or during a time period upon elapse of a time period from a prescribed leading edge of a rectangular-wave output signal from the vertical synchronizing signal separator, the field detector determines the binary level of an output signal applied by the equalizing pulse remover to the data input terminal for deriving the field discriminating signal of either a high level or a low level, the arrangement being such that an output signal from the equalizing pulse remover is applied to a reference input terminal of the frequency synthesizer to enable the frequency synthesizer to produce from an output terminal thereof a signal that is obtained by multiplying the horizontal synchronizing signal.

Yet another object of the present invention is to provide a synchronizing signal generating circuit comprising: a field discriminating circuit for deriving a field discriminating signal from a composite synchronizing signal relative to a plurality of composite video signals having different numbers of scanning lines and produced from different video output devices; a frequency synthesizer including at least a prescaler for multiplying a horizontal synchronizing signal based on the composite synchronizing signal; an F/V converter; an equalizing pulse remover and a vertical synchronizing signal separator which are controlled by the F/V converter, the F/V converter, the equalizing pulse remover, and the vertical synchronizing signal separator being receptive of the composite synchronizing signal; and a field detector including at least one delay flip-flop means and having a data input terminal connected to an output terminal of the equalizing pulse remover, a trigger input terminal connected to an output terminal of the vertical synchronizing signal separator, and a time constant control terminal connected to an output terminal of the F/V converter; the field discriminating circuit being arranged such that at a time or during a time period upon elapse of a time period from a prescribed leading edge of a rectangular-wave output signal from the vertical synchronizing signal separator, the field detector determines the binary level of an output signal applied by the equalizing pulse remover to the data input terminal for deriving the field discriminating signal of either a high level or a low level, the arrangement being such that an output signal from the equalizing pulse remover is applied to a reference input terminal of the frequency synthesizer and an output signal from the F/V converter is applied as a control signal as the prescaler to enable the prescaler to produce from an output terminal of the frequency synthesizer a signal that is obtained by multiplying the horizontal synchronizing signal.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a timing chart of operation of the field discriminating circuit shown in FIG. 3;

FIGS. 6 through 8 are timing charts of operation of the field discriminating circuit shown in FIG. 3;

FIGS. 24A through 24D are block diagrams of image storing apparatus according to other embodiments which incorporate the synchronizing signal generating circuit of the present invention.

DETAILED DESCRIPTION OF THE PREFERRED EMBODIMENTS

Figure 1:
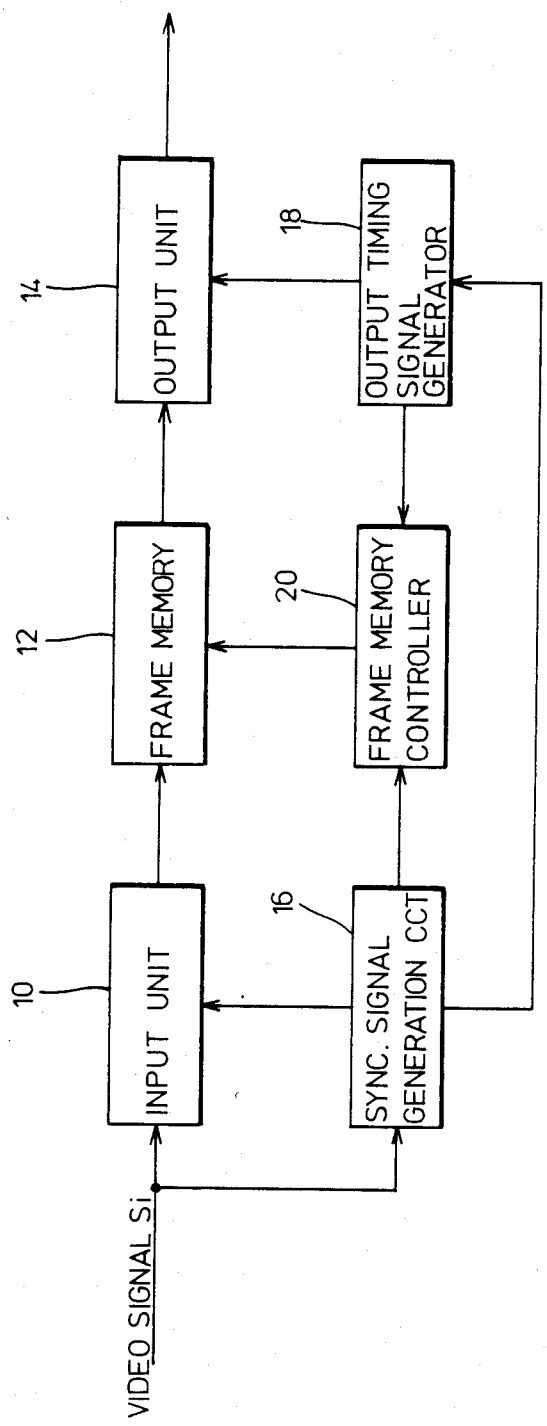
FIG. 1 is a block diagram of an image storing apparatus in which a synchronizing signal generating circuit according to the present invention is incorporated.

FIG. 1 shows in block form an image storing apparatus incorporating a synchronizing signal generating circuit according to the present invention. As shown in FIG. 1, the image storing apparatus basically comprises an input unit 10 for converting various video signals Si composed of different numbers of scanning lines from analog form to digital form, a frame memory 12 for storing the digital video signals, an output unit 14 for converting the stored digital video signals to analog video signals and issuing them, a synchronizing signal generating circuit 16 for generating sampling pulses in synchronism with the horizontal synchronizing signals of the input video signals and field discriminating signals for the input video signals, an output timing signal generator 18 for supplying a signal to the output unit 14 to cause the same to issue the video signals stored in the frame memory 12, and a frame memory controller 20 responsive to signals from the synchronizing signal generating circuit 16 and the output timing signal generator 18 for controlling the process of storing the video signals from the input unit 10 into the frame memory 12 and the process of issuing the video signals from the frame memory 12 to the output unit 14.

Figure 2:
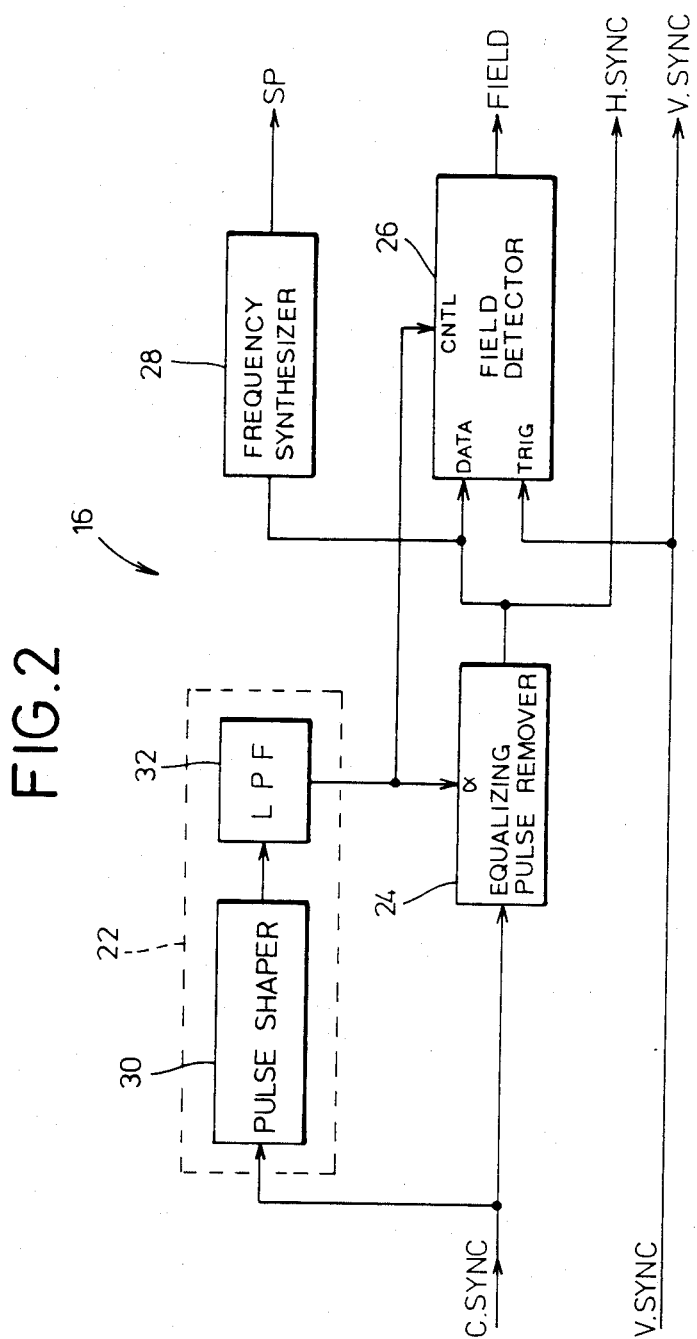
FIG. 2 is a block diagram of the synchronizing signal generating circuit of the invention.

The synchronizing signal generating circuit 16 in accordance with the present invention is constructed as shown in FIG. 2.

The synchronizing signal generating circuit 16 essentially comprises an equalizing pulse remover 24 controlled by an F/V converter 22, a field detector 26, and a frequency synthesizer 28 serving as an N-multiplier (N is a natural number). The F/V converter 22 is composed of a pulse shaper 30 and a low-pass filter (hereinafter referred to as an "LPF") 32 including a level shifter (described later).

In FIG. 2, a composite synchronizing (hereinafter referred to as a "C.SYNC") signal separated from the composite video signal Si is supplied to the equalizing pulse remover 24 and the pulse shaper 30 of the F/V converter 22. The C.SYNC signal is in the form of a combination of a horizontal synchronizing (hereinafter referred to as "H.SYNC") signal, a vertical synchronizing (hereinafter referred to as "V.SYNC") signal, equalizing pulses, and serrated pulses.

The output signal from the F/V converter 22 is applied to a time-constant control input terminal α of the equalizing pulse remover 24 and a time-constant control input terminal CNT of the field detector 26. The output signal from the equalizing pulse remover 24, i.e., the H.SYNC signal, and the output signal from a vertical synchronizing separator (not shown), i.e., the V.SYNC signal, are applied to a data input terminal DATA and a trigger input terminal TRIG of the field detector 26. The field detector 26 is arranged to issue, from its output terminal, an even-numbered or odd-numbered field discriminating signal FIELD for the composite video signal Si. The output signal H.SYNC from the equalizing pulse remover 24 is applied to the reference input terminal of the freuqency synthesizer 28 employing a PLL (phase-locked loop). The output signal from the frequency synthesizer 28 is issued as sampling pulses SP which are produced by multiplying the H.SYNC signal accurately by N. The field discriminating signal FIELD, the H.SYNC signal, the V.SYNC signal, and the sampling pulses SP which are issued from the synchronizing signal generating circuit 16 are supplied to an image memory or an A/D converter (described later) and used as address or timing signals.

Figure 3:
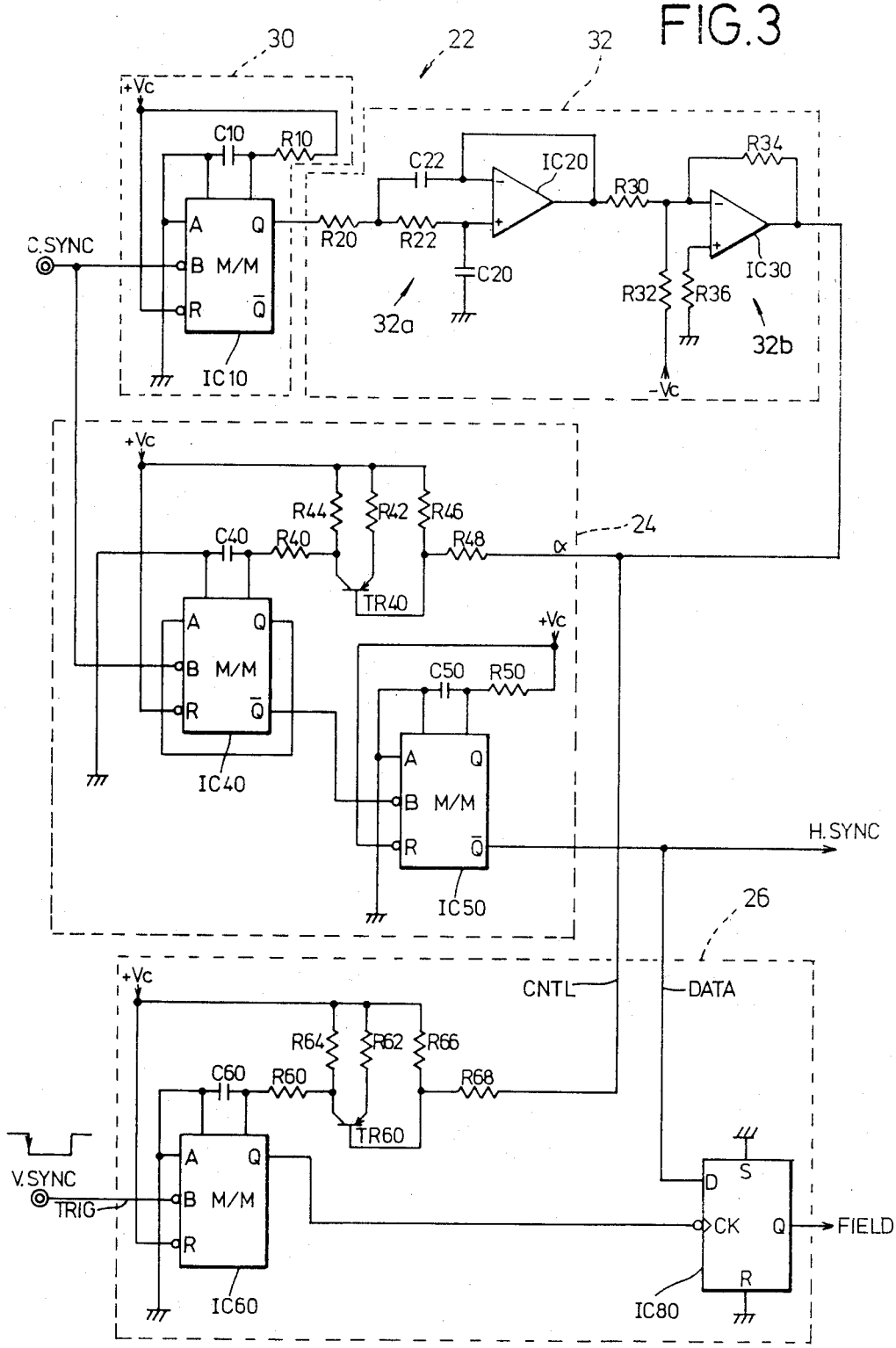
FIG. 3 is a detailed circuit diagram of a field discriminating circuit in the synchronizing signal generating circuit shown in FIG. 2.

A field discriminating circuit, except the frequency synthesizer 28, in the synchronizing signal generating circuit 16 shown in FIG. 2 is shown in detail in FIG. 3.

As can easily be understood from FIG. 3, the pulse shaper 30 is basically composed of a first monostable multivibrator 10 (hereinafter referred to as an "M/MIC 10" or an "IC 10"). The LPF 32 comprises a low-pass filter 32a composed of a first operational amplifier IC20 and a level shifter 32b composed of a second operational amplifier IC30. The equalizing pulse remover 24 comprises an M/MIC 40 and an M/MIC 50. The field detector 26 basically comprises an M/MIC 60 and a first D-type IC 80 (hereinafter referred to as an "F/FIC 80" or an "IC80"). Denoted at Vc in FIG. 2 is a power supply voltage. Although not shown, each IC is supplied with +Vc or −Vc.

Operation and advantages of the synchronizing signal generating circuit thus constructed will be described below. For an easier understanding of the present invention, the field discriminating circuit in the synchronizing signal generating circuit will first be described, then the image storing apparatus incorporating the synchronizing signal generating circuit will be described, and the frequency synthesizer serving as the N-multiplier for generating sampling pulses, in the synchronizing signal generating circuit, will finally be described.

The field discriminating circuit will be described hereinbelow. FIG. 4 shows at (a) the C.SYNC signal which is produced by removing the video signal from the composite video signal Vi and which is subjected to synchronizing separation. The C.SYNC signal includes the H.SYNC signal, the V.SYNC signal, the equalizing pulses, and the serrated pulses, as can be understood from FIG. 4. The H.SYNC signal of the C.SYNC signal has a period $T_H$ of 63.5 μs, 525 scanning lines, and a field frequency of 60 Hz. FIG. 4 illustrates various signals of the C.SYNC signal in the vicinity of the V.SYNC signal for a first field.

Figure 5B:
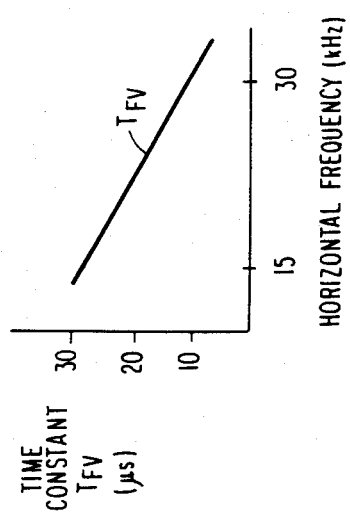
FIG. 5b is a graph of characteristics of a field detector in the field discriminating circuit shown in FIG. 3.
Figure 5A:
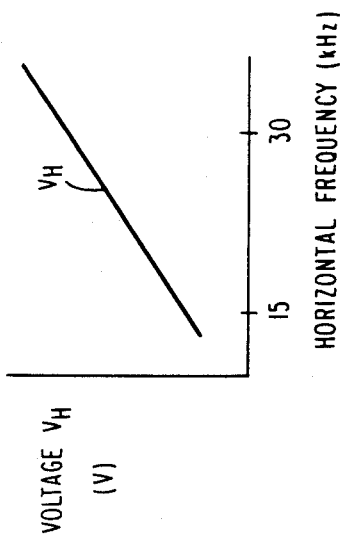
FIG. 5a is a graph of characteristics of an F/V converter in the field discriminating circuit shown in FIG. 3.

The C.SYNC signal is applied to the F/V converter 22 and the equalizing pulse remover 24. As described above, the F/V converter 22 essentially comprises the M/MIC 10 and the operational amplifier 20. The output signal from the M/MIC 10 is smoothed into a DC signal by the low-pass filter 32a comprising the operational amplifier IC 20. The time constant of the M/MIC 10 that is determined by a resistor R10 and a capacitor C10 is selected to be smaller than the period relative to a maximum horizontal synchronizing frequency applied to the synchronizing signal generating circuit 16. With such a time constant setting, it is possible for the output signal from the operational amplifier IC20 to be a voltage signal $V_H$ that increases in proportion to the horizontal synchronizing frequency as shown in FIG. 5(a). The voltage signal $V_H$ is kept at a substantially constant level insofar as the horizontal synchronizing signal is constant, i.e., when the applied composite video signal is a video signal issued from the same imaging device or an imaging device of the same type.

The voltage signal $V_H$ is then inverted in polarity and amplified by the level shifter 32b comprising the operational amplifier IC30, and supplied to the time-constant control input terminal α of the equalizing pulse remover 24 and the time constant control input terminal CNTL of the field detector 26.

The equalizing pulse remover 24 operates as follows: As described above, the equalizing pulse remover 24 comprises the second M/MIC 40 and the third M/MIC 50. The second M/MIC 40 operates as a retriggerable M/M, and the third M/MIC 50 operates as an ordinary M/M. The time constant of the retriggerable M/M, i.e., the second M/MIC 40 is selected to be about $\frac{3}{4}$ of a horizontal synchronizing period $T_H$, and the time constant of the third M/MIC 50 is selected to be substantially equal to the SYNC width of the H.SYNC signal, e.g., $7/100\ T_H$. The time constant of the second M/MIC 40 is selected to be $\frac{3}{4} T_H$ for the reason that even if there is an error with respect to the position where the equalizing pulses are inserted and the setting accuracy, it is assumed that such an error does not exceed the range of from $\frac{1}{2} T_H$ to $1\ T_H$.

The output signal from the equalizing pulse remover 24, i.e., the output signal from the third M/MIC 50 is converted to the H.SYNC signal shown in FIG. 4(b). More specifically, since the time constant of the second M/MIC 40 is $\frac{3}{4} T_H$, the output signal from the third M/MIC 50 is converted to the signal which is produced by removing the equalizing pulses and the serrated pulses inserted at the positions of about $\frac{1}{2}$ of the period of the H.SYNC signal from the C.SYNC signal. The H.SYNC signal is then applied to the data input terminal DATA of the field detector 26.

Prior to describing operation of the field detector 26, the characteristics of the vertical synchronizing signal, i.e., V.SYNC signal applied to the input terminal TRIG of the field detector 26 will be described.

The V.SYNC signal can be represented by a signal as shown in FIG. 4(c) which is produced by double-integrating the C.SYC signal, as is well known. Through such integrating process, however, the V.SYNC signal is subjected to a time delay. FIG. 4 show at (d) through (h) signal portions, enlarged with respect to time, of those signal waveforms surrounded by broken lines as shown at (a) through (c). The enlarged signal waveforms shown at (d) through (f) correspond respectively to those shown at (a) through (c). FIG. 4(f) shows an enlarged waveform of the V.SYNC signal. As can be understood from FIG. 4(f), the time delay of the V.SYNC signal is represented by a time delay Ta from a negative-going edge EN of the C.SYNC signal shown in FIG. 4(d). The V.SYNC signal is applied to the trigger input terminal TRIG of the field detector 26.

The field detector 26 operates in the following manner: The three input terminals CNTL, DATA, and TRIG of the field detector 26 are supplied respectively with the output voltage signal $V_H$ of the F/V converter 22, the output H.SYNC signal (see FIG. 4(e)) of the equalizing pulse remover 24, and the V.SYNC signal (see FIG. 4(f)). As described above, the field detector 26 comprises the fourth M/MIC 60 and the first F/F IC 80. The fourth M/MIC 60 is triggered by the negative-going edge of the V.SYNC signal, and the first F/FIC 80 is triggered by a negative-going edge of the output signal from the fourth M/MIC 60. The time constant of the fourth M/MIC 60 is controlled by the output signal from the F/V converter 22. More specifically, as described above, the output voltage of the F/V converter 22, stated otherwise, the voltage applied to the input terminal CNTL of the field detector 26 is lowered in proportion to the horizontal synchronizing frequency of the signal applied to the synchronizing signal generating circuit 16. Therefore, the base voltage of a transistor TR60 drops, and the collector current thereof increases, so that the time constant of the fourth M/MIC 60 is reduced. That is, the time constant of the fourth M/MIC 60 is reduced in proportion to the horizontal synchronizing frequency. This is illustrated in FIG. 5(b). Assuming that the time constant of the fourth M/MIC 60 is indicated by $T_{FV}$, it is approximately expressed by the following equation (1):

$$T_{FV} \approx T_H/2 - Ta \qquad (1)$$

where
- Ta: the time delay caused by the vertical synchronizing separator; and
- $T_H$: the period of the horizontal synchronizing frequency.

For example, if the period of the horizontal synchronizing frequency is $T_H = 63.5$ us and the time delay is $Ta \approx 6$ μs, then the time constant $T_{FV}$ of the fourth M/MIC 60 should be $T_{FV} \approx 26$ μs. At this time, the output signal of the fourth M/MIC 60 is of a waveform as shown in FIG. 4(g). When this output signal is applied to the clock input terminal CK of the first F/FIC 80, the negative-going edge thereof allows level data applied to the data input terminal D of the first F/FIC 80 to be transferred to the output terminal Q. The level data is equal to the H.SYNC signal shown in FIG. 4(e). Since the level of the level data is high, the output signal of the first F/FIC 80, i.e., the even/odd field discriminating signal FIELD of the field detector 26 changes from the low to the high level as shown in FIG. 4(h). Field discrimination is made possible by determining an odd-numbered field when the field discriminating signal FIELD is of a high level and an even-numbered field when the field discriminating signal FIELD is of a low level.

The field discriminating signal FIELD determines an address of the image memory for accurately storing data in the image memory. This operation is not described in detail as it is not an essential feature of the present invention.

In the above description, the number of scanning lines is 525, the field frequency is 60 Hz, the horizontal synchronizing frequency is 15.75 KHz, and the input signal is applied for an odd-numbered field.

Now, operation will be described in which the input signal is applied for an even-numbered field. FIG. 6 is a timing chart of such operation. The signals shown at (a) through (h) in FIG. 6 correspond respectively to the signals shown at (a) through (h) in FIG. 4. As can easily be understood from FIG. 6, the V.SYNC signal and the H.SYNC signal of the C.SYNC signal are ½ $T_H$ shifted from each other at the negative-going edge of the V.SYNC signal as compared with the signals for the odd-numbered field as shown in FIG. 4. Therefore, upon comparison of an enlarged waveform, as shown in FIG. 6(e), of the H.SYNC signal applied to the data input terminal D of the first F/FIC 80 with a negative-going edge, as shown in FIG. 6(g), of the output signal applied from the fourth M/MIC 60 to the clock input terminal CK of the first F/FIC 80, the output signal of the first F/FIC 80, i.e., the output signal FIELD of the field detector 26 changes from the high level to the low level as shown in FIG. 6(h). Therefore, it is known that the input signal is for an even-numbered field. This even-numbered field discriminating signal is also used as address data for the image memory (not shown).

The above operation is directed to discrimination between odd-numbered and even-numbered fields for 525 scanning lines and a horizontal frequency of 15.75 KHz. The synchronizing signal generating circuit 16 of the present invention is arranged such that, as shown in FIGS. 5(a) and (b), the time constant of the second M/MIC 40 in the equalizing pulse remover 24 automatically becomes ¾ $T_H$ in proportion to the horizontal frequency. Therefore, the time constant $T_{FV}$ of the fourth M/MIC 60 in the field detector 26 also automatically becomes $T_{FV} = T_H/2 - Ta$. Consequently, even for a video signal having a horizontal frequency of 33.75 KHz and 1000 scanning lines, for example, a field discriminating signal FIELD can automatically be obtained without changing circuit constants, as shown in FIG. 7 (for odd-numbered field discrimination) and in FIG. 8 (for even-numbered field discrimination). The signals shown in FIG. 7 at (a) through (h) and FIG. 8 at (a) through (h) correspond respectively to the signals shown in FIG. 4 at (a) through (h) and FIG. 6 at (a) through (h).

Figure 9:
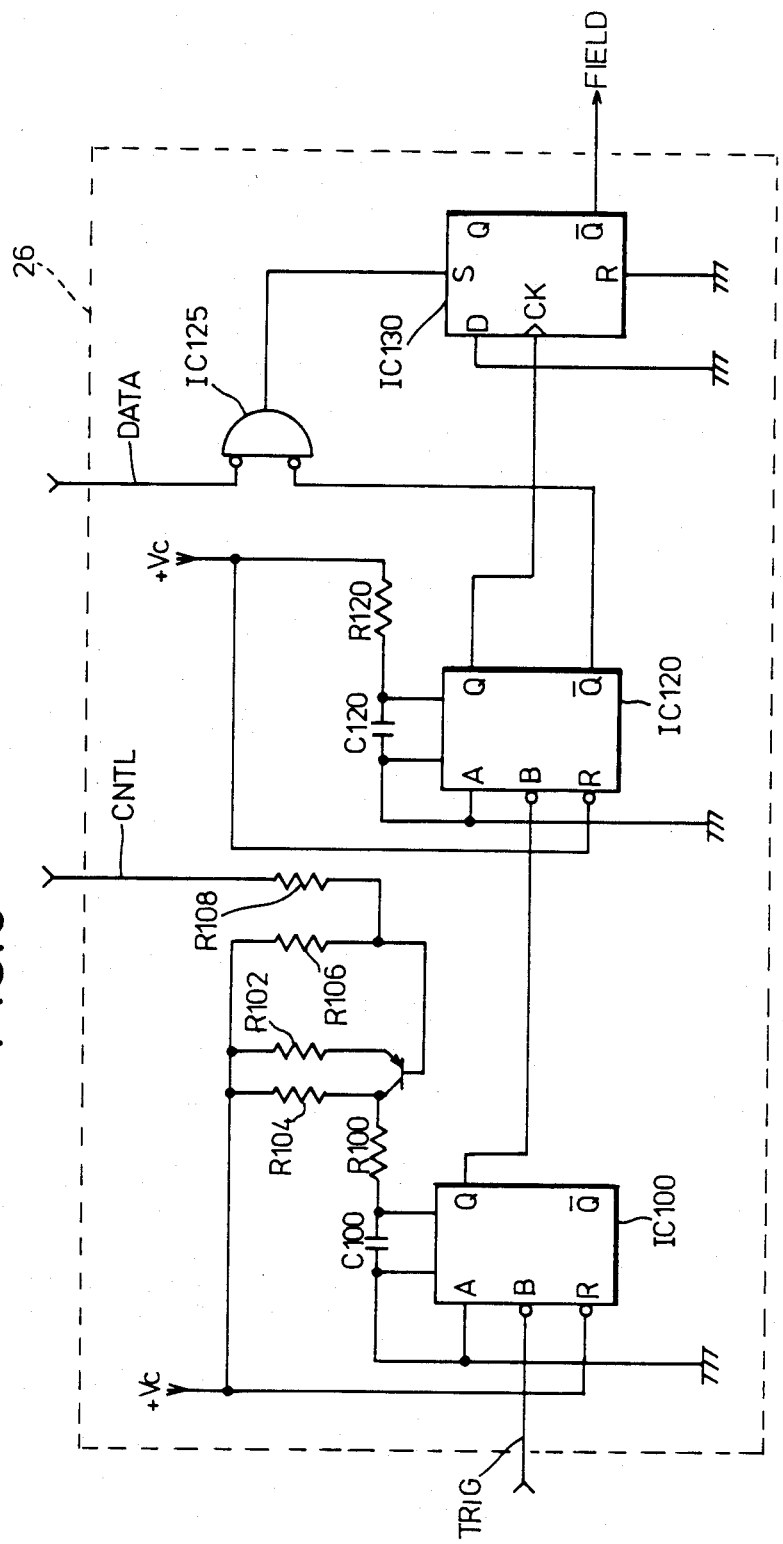
FIG. 9 is a detailed circuit diagram of a field discriminating circuit according to another embodiment.

FIG. 9 shows a field detector 26 according to another embodiment of the present invention. The field detector 26 shown in FIG. 9 is basically composed of a fifth M/MIC 100, a sixth M/MIC 120, a negative-logic AND gate 125, and a second F/FIC 130.

The sixth M/MIC 120 is driven by the output signal from the fifth M/MIC 100. The negative-logic AND gate 125 ascertains whether there is an H.SYNC width $T_{SH}$ (see FIG. 10(e)) of the H.SYNC signal applied to the input terminal DATA of the field detector 26 during the period of a low level signal from the negative output terminal $\overline{Q}$ of the sixth M/MIC 120. A field discriminating signal FIELD is issued from the $\overline{Q}$ output terminal of the second F/FIC 130. This embodiment therefore employs a level detecting system rather than the edge detecting system according to the previous embodiment.

Figure 11:
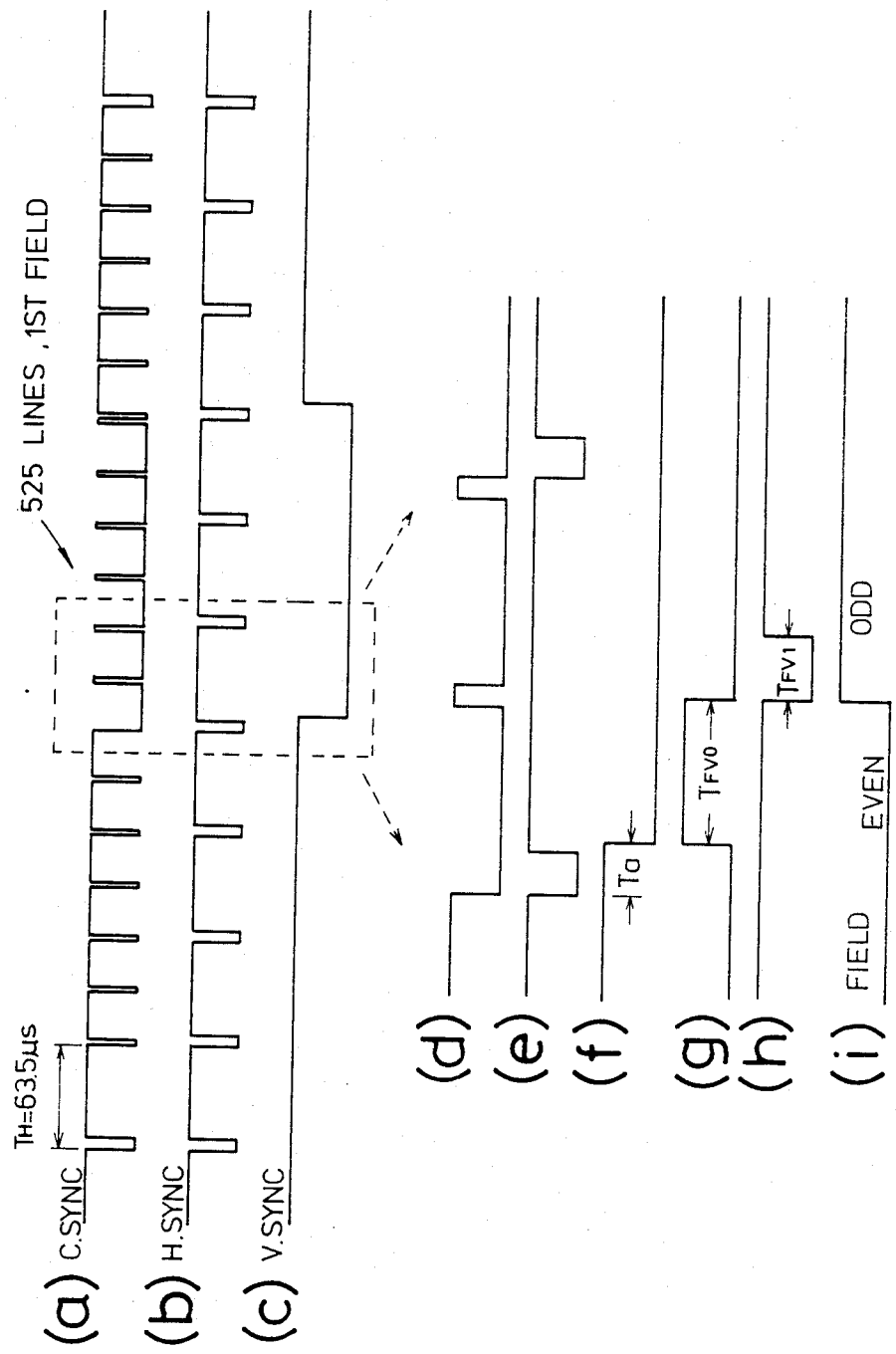

As can be seen from FIG. 11 at (e) through (h), the time constant $T_{FVO}$ of the fifth M/MIC 100 is determined according the following equation (2):

$$Ta + T_{FVO} < T_H \quad (2)$$

and the time constant $T_{FVI}$ of the sixth M/MIC 120 is determined according to the following equation (3):

$$T_{FVI} > T_{SH} \quad (3)$$

The number of elements or components of the circuit according to the embodiment of FIG. 9 is slightly increased, but conditions for designing the circuits are much less severe than those of the preceding embodiment.

Figure 10:
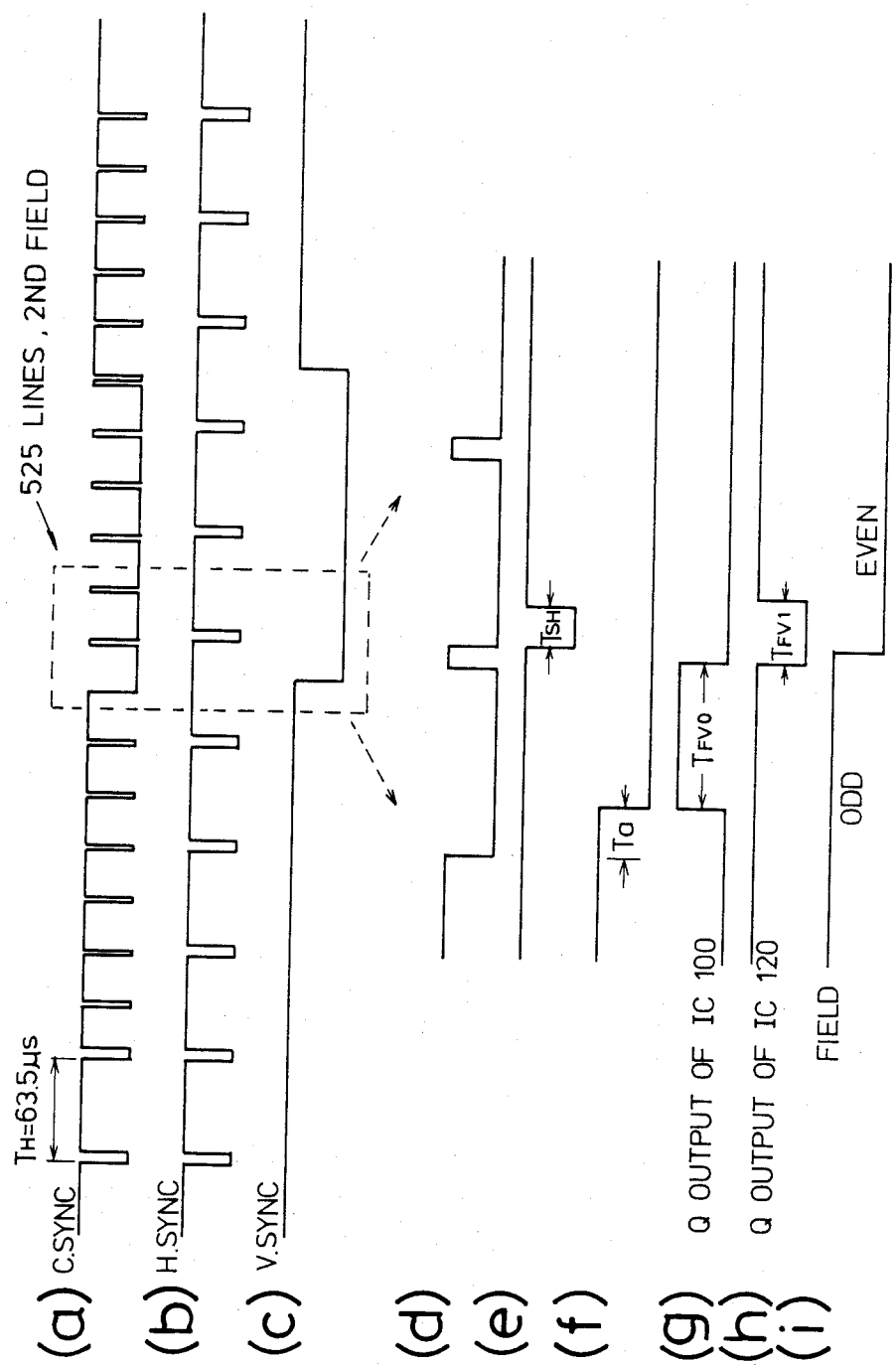
FIGS. 10 through 13 are timing charts of operation of the field discriminating circuit shown in FIG. 9.
Figure 12:
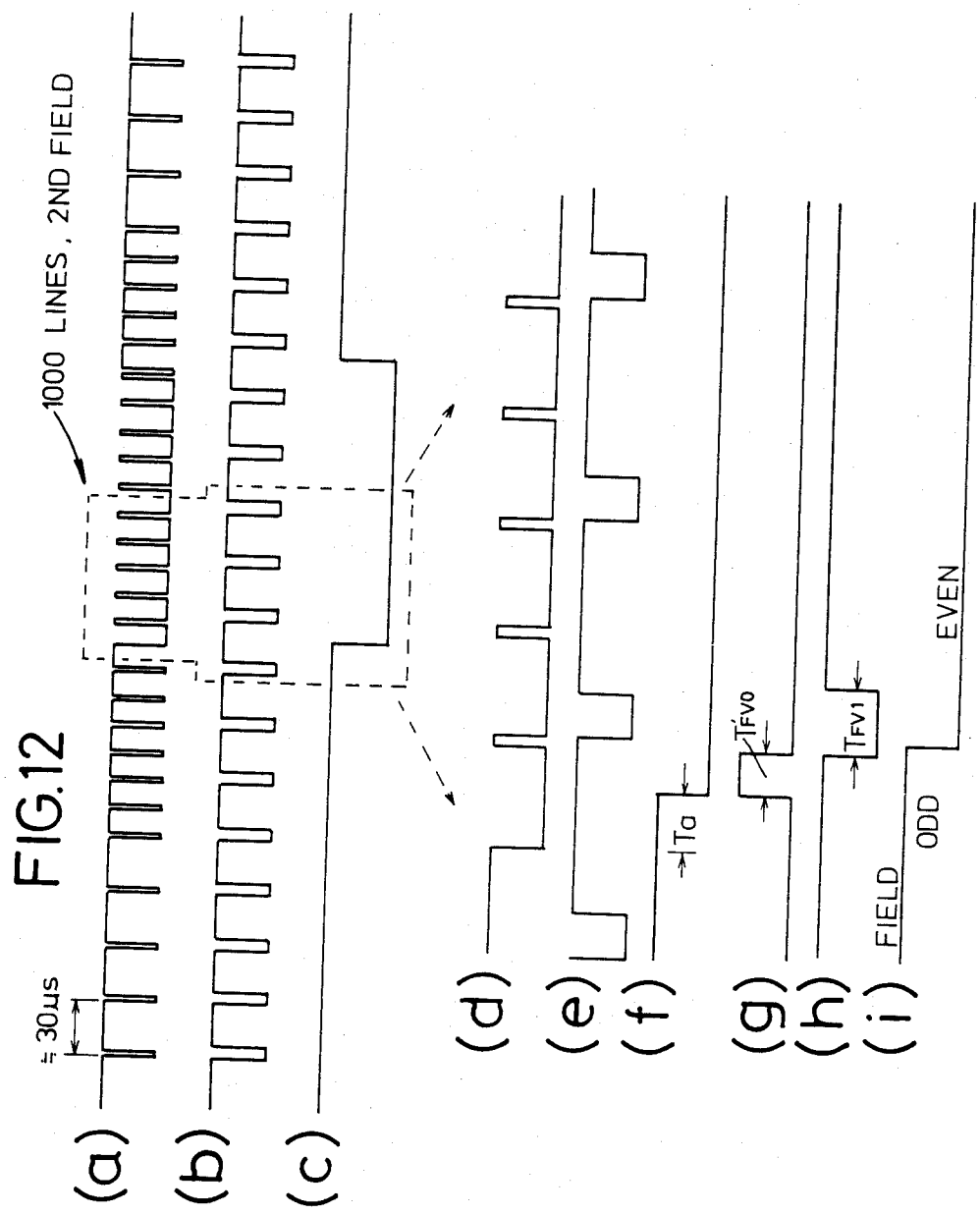
Figure 13:
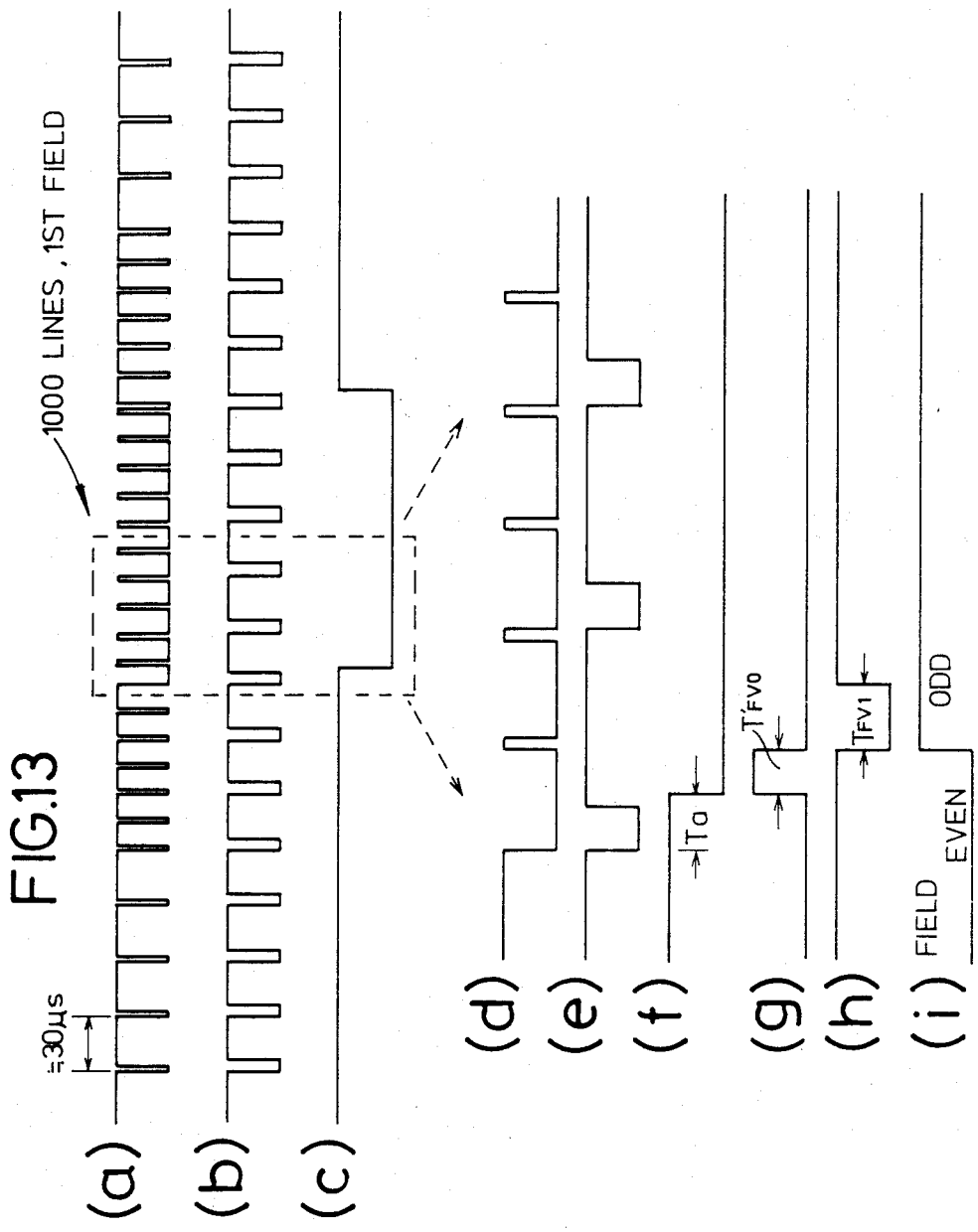

FIGS. 10 and 11 are timing charts for even/odd-field discrimination for signals of 525 scanning lines, and FIGS. 12 and 13 are timing charts for even/odd-field discrimination for signals of 1000 scanning lines. Since the timing charts for even/odd-field discrimination for signals of 1000 scanning lines can easily be understood with reference to the above description, its detailed explanation will not be given.

Now, the image storing apparatus in which the synchronizing signal generating circuit of the invention is incorporated and the frequency synthesizer serving as the N-multiplier will be described below.

When the composite video signal Si is applied to the input unit 10 in FIG. 1, a video signal portion (horizontal display time) is converted to a digital signal and supplied to the frame memory 12. The composite video signal Si is also supplied to the synchronizing signal generating circuit 16 through a sync. separator (described later), and sampling pulses SP are generated in the synchronizing signal generating circuit 16. The sampling pulses SP are supplied to the input unit 10, the frame memory controller 20, and the output timing signal generator 18. The sampling pulses 20 are used as clock pulses for the entire image storing apparatus, i.e., as sampling pulses for an A/D converter in the input unit 10, for controlling the storage of the video signal, per line, into the frame memory controller 20, and for generating an output timing signal.

The frequency synthesizer 28 of the synchronizing signal generating circuit 16 is essentially composed of a PLL (phase-locked loop). The PLL has a phase comparator and a voltage-controlled oscillator (hereinafter referred to as a "VCO") supplied with the output signal from the phase comparator through a low-pass filter. The VCO generates the sampling pulses SP dependent on the voltage. The sampling pulses SP are frequency-divided at a ratio of N by a frequency divider, and fed back to the phase comparator for phase comparison with the H.SYNC signal to achieve accurate synchronization. The sampling pulses SP are supplied to the frame memory controller 20 for storing the video signal into the frame memory 12.

The output of the video signal stored in the frame memory 12 is controlled by the output timing signal generated by the output timing signal generator 18 and supplied to the frame memory controller 20. The signal from the output timing signal generator 18 is also fed to the output unit 14, which introduces data stored in an external memory, for example, into the image storing apparatus, converts the data to an analog signal, and issues the same as a video signal.

As described above, the frequency synthesizer 28 of the synchronizing signal generating circuit 16 operates such that the sampling pulses SP generated by the VCO are frequency-divided by a programmable modulo-N frequency divider and synchronized with the horizontal synchronizing signal by the phase comparator. Therefore, the period of the sampling pulses SP from the VCO can freely be varied by changing the frequency-dividing ratio N. By sampling the video signal with the sampling pulses SP, a video period per line can be stored in the frame memory 12 according the number of scanning lines on the output side.

The period of the sampling pulses SP may be set either automatically by a microcomputer or the like in connection with a display unit on the output side or manually while confirming a displayed video image.

Where the period of sampling pulses per line of a sampled video signal is set to a desired period, the number N of sampling pulses SP per line is expressed by the number A of pulses in a desired image and the number B of pulses in a non-image area according to the following equation (4):

$$N = A + B \quad (4)$$

With the above setting procedure, images can be stored in the frame memory 12 in synchronism with video input signals composed of different numbers of scanning lines and stored images can be issued as video signals having desired numbers of scanning lines.

As another method of determining the period, the number N of pulses per line can be determined by the period $T_H$ of the horizontal synchronizing frequency and the period $T_S$ of oscillation of sampling pulses of output video signals from signal sources according to the following equation (5):

$$N = [T_H/T_S] \quad (5)$$

where the symbol [ ] is a Gaussian symbol N an integer.

By effecting the sampling process according to the above determining method, beating of a sampled image caused by the frequency difference between the output sampling period due to a digital image and the sampling period of an A/D converter, and collapsing of edges of small characters being displayed can be eliminated, and good images can be reproduced without a reduction in resolution.

Figure 14:
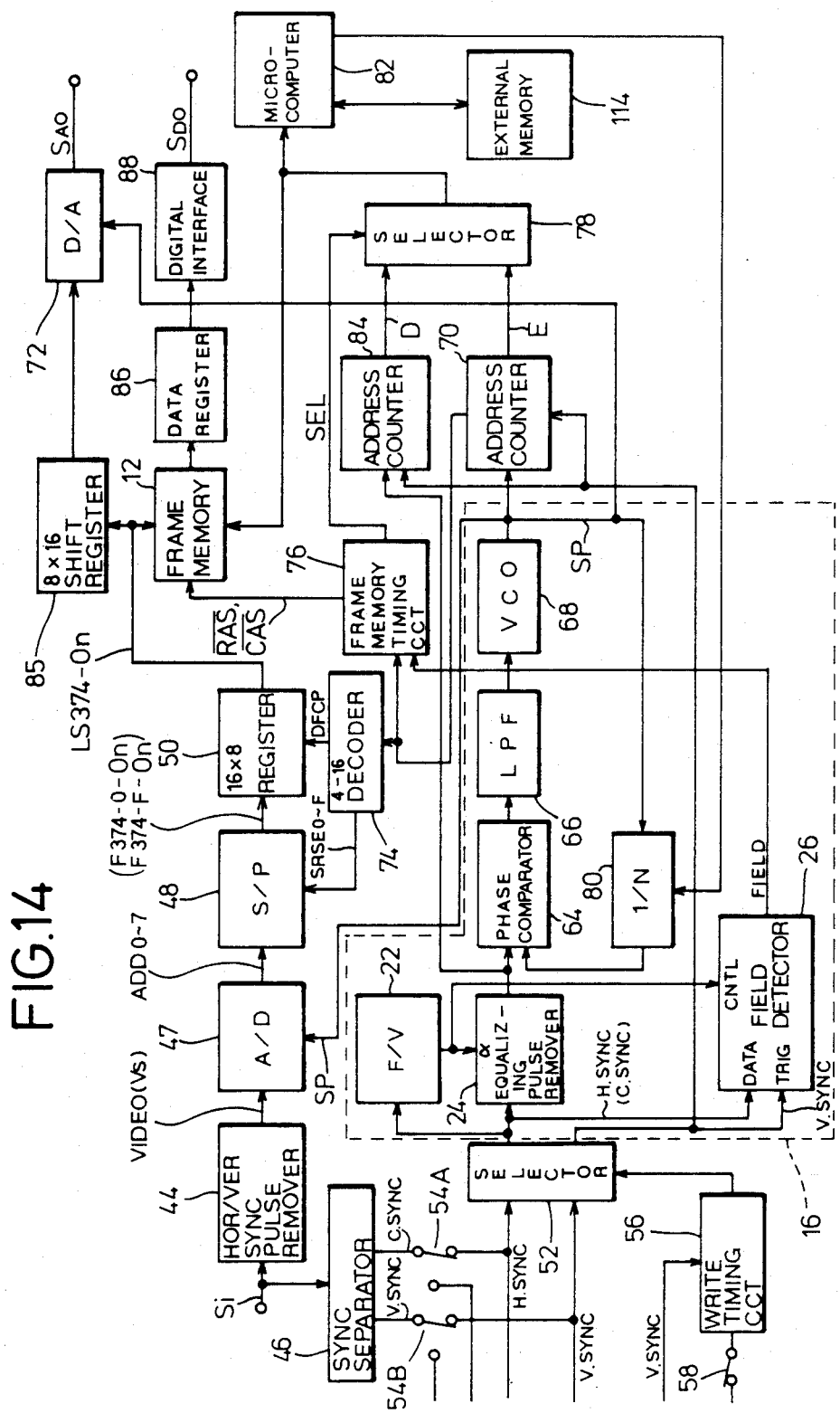
FIG. 14 is a detailed block diagram of an image storing apparatus incorporating the synchronizing signal generating circuit of the present invention.

FIG. 14 shows in detailed block form a video image storing apparatus which incorporates the synchronizing signal generating circuit 16 of the present invention. Operation of the video image storing apparatus will be described below.

In FIG. 14, an input video signal Si is supplied to a horizontal/vertical synchronizing pulse remover 44 and a sync. separator 46. The output signal VIDEO ($V_S$) from the horizontal/vertical synchronizing pulse remover 44, after horizontal/vertical synchronizing pulses have been removed therefrom, is supplied to an A/D converter 47. The output signal (ADD0–ADD7) from the A/D converter 47 is supplied to a serial-to-parallel converter 48, the output signal (F374-O-On–F374-F-On) of which is supplied to a register 50. By the register 50, the output signal therefrom is stored into a frame memory 12 in order to meet the cycle time of the frame memory 12. The output signal from the register 50 is indicated as LS374-On in FIG. 14.

The frame memory 12 employed in this embodiment has a memory capacity of 1024×1024×8 bits and can receive an input video signal Si having up to 1024 scanning lines. Although the frame memory 12 can store images of more than 1024 scanning lines, part of such images may not be stored.

In the sync. separator 46, the video image Si is separated into a C.SYNC signal and a V.SYNC signal which are supplied a selector 52, which can also be supplied with a H.SYNC signal or a V.SYNC signal from an external synchronizing signal source, other than the C.SYNC and V.SYNC signals of the signal Si, through switches 54A, 54B. The selector 52 can further be supplied with a H.SYNC signal and a V.SYNC signal from a video generator (not shown). The video generator is used especially for playback and can issue a video signal composed of any desired number of scanning lines. The selector 52 is also supplied with an output signal from a write timing circuit 56. When a write timing switch 58 is rendered conductive, the write timing circuit 56 applies a write timing signal to the selector 52 in synchronism with the V.SYNC signal.

The C.SYNC signal or the H.SYNC signal from the selector 52 are supplied to the equalizing pulse remover 24, the F/V converter 22, and the field detector 26 of the synchronizing signal generating circuit 16. The output signal, or the H.SYNC signal, from the equalizing pulse remover 24 is issued through a phase comparator 64 and a low-pass filter (LPF) 66 of the frequency synthesizer 28 to a VCO 66. The H.SYNC signal applied to the equalizing pulse remover 24 is issued as it is in waveform (see FIG. 4).

The output signal from the VCO 68, that is, sampling pulses SP, are supplied to an address counter 70, the A/D converter 47, and a D/A converter 72. The output signal from the address counter 70 is fed to a decoder 74 which converts the signal from a 4-bit signal to a 16-bit signal (SRSEL0–SRSELF), which is supplied to the S/P converter 48. Upon elapse of a short period of time after the output SRSELF signal has been issued from the decoder 74, a signal DFCP is supplied from the decoder 74 to the register 50. The register 50 is arranged to establish timing for storage into the frame memory 12, and to store 128-bit data LS374-On 64 times per line.

The output signal SP from the VCO 68 and the output signal FIELD from the field detector 26 are supplied to a frame memory timing circuit 76, which applies signals $\overline{RAS}$, $\overline{CAS}$ to the frame memory 12 and a select signal SEL to a selector 78.

The output pulses SP from the VCO 68 are fed back to the phase comparator 64 through a modulo-N frequency divider 80. The phase comparator 64, the LPF 66, the VCO 68, and the modulo-N frequency divider 80 jointly constitute the PLL frequency synthesizer 28.

The modulo-N frequency divider 80 can frequency-divides the pulses generated by the VCO 68 at N to produce pulses at the same period as that of the H.SYNC signal applied to the reference signal input terminal of the phase comparator 64. The frequency-dividing ratio N is established by a microcomputer 82. If the number of sampling pulses is to be 1024, for example, the number produced by adding the number B of pulses in an unwanted area of the video signal to 1024 should be set to N (N = 1024+B).

The V.SYNC signal issued from the selector 52 is supplied via aa back- and front-porch setting circuit (not shown) to the address counter 70 and an address counter 84 for discriminating boundaries of each image. The output signal D from the address counter 70 and the output signal E from the address counter 84 are supplied to the selector 78, and selectively applied to the frame memory 12.

A video output analog signal $S_{AO}$ is issued from the frame memory 12 via a shift register 85 and the D/A converter 72. A video output digital signal $S_{DO}$ is issued from the frame memory 12 via a data register 86 and a digital interface 88.

The video output analog signal $S_{AO}$ and the video output digital signal $S_{DO}$ may be fed to various output devices such as a medical laser printer (LP), a PACS, a multiformat camera, an X-ray TV system, a display unit for use in a hospital, and the like.

Operation of the video image storing apparatus will be described with reference to FIGS. 15 and 16 which show timing charts of each signal according to FIG. 14.

Figure 15:
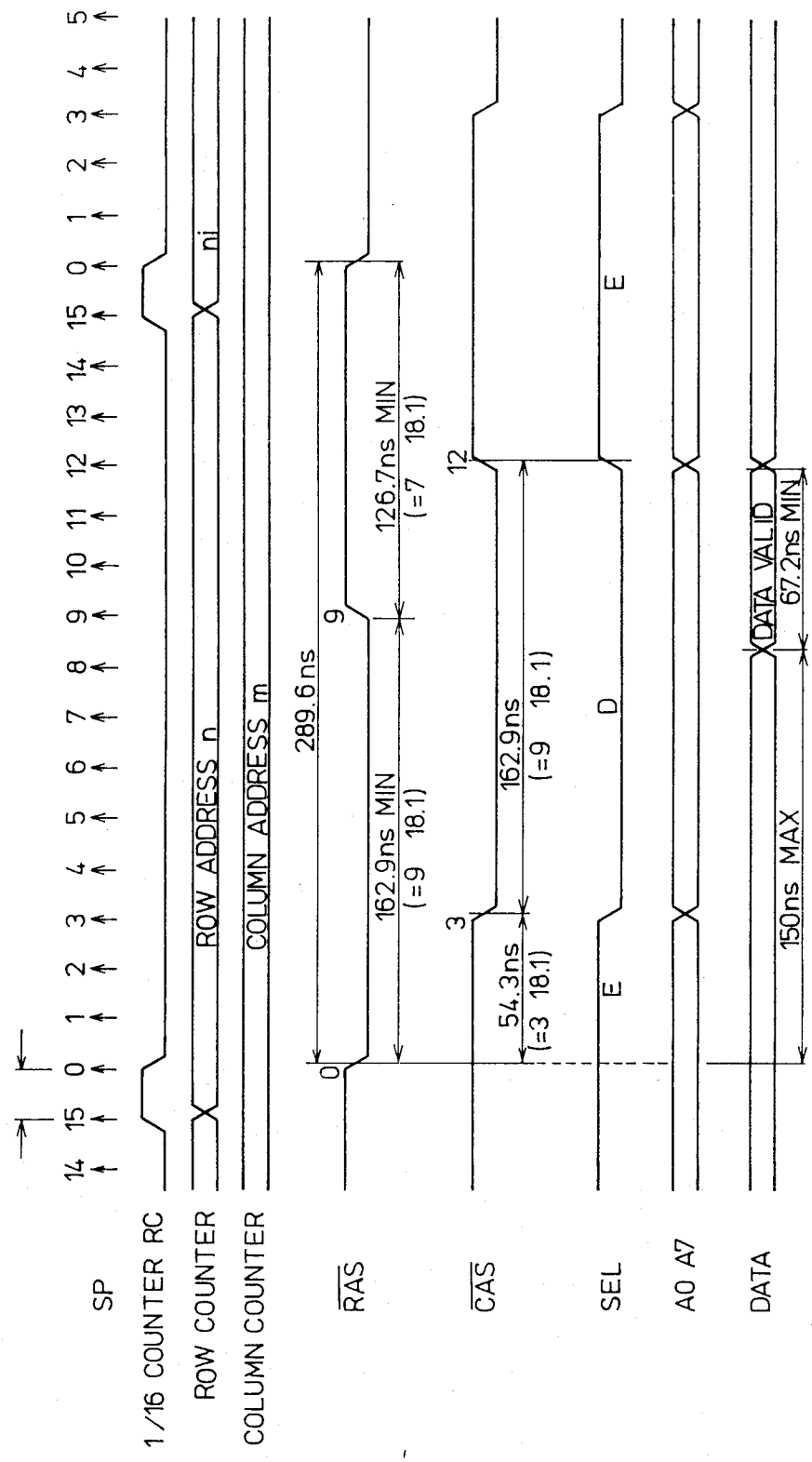
FIGS. 15 and 16 are timing charts of operation of the image storing apparatus illustrated in FIG. 14.
Figure 16:
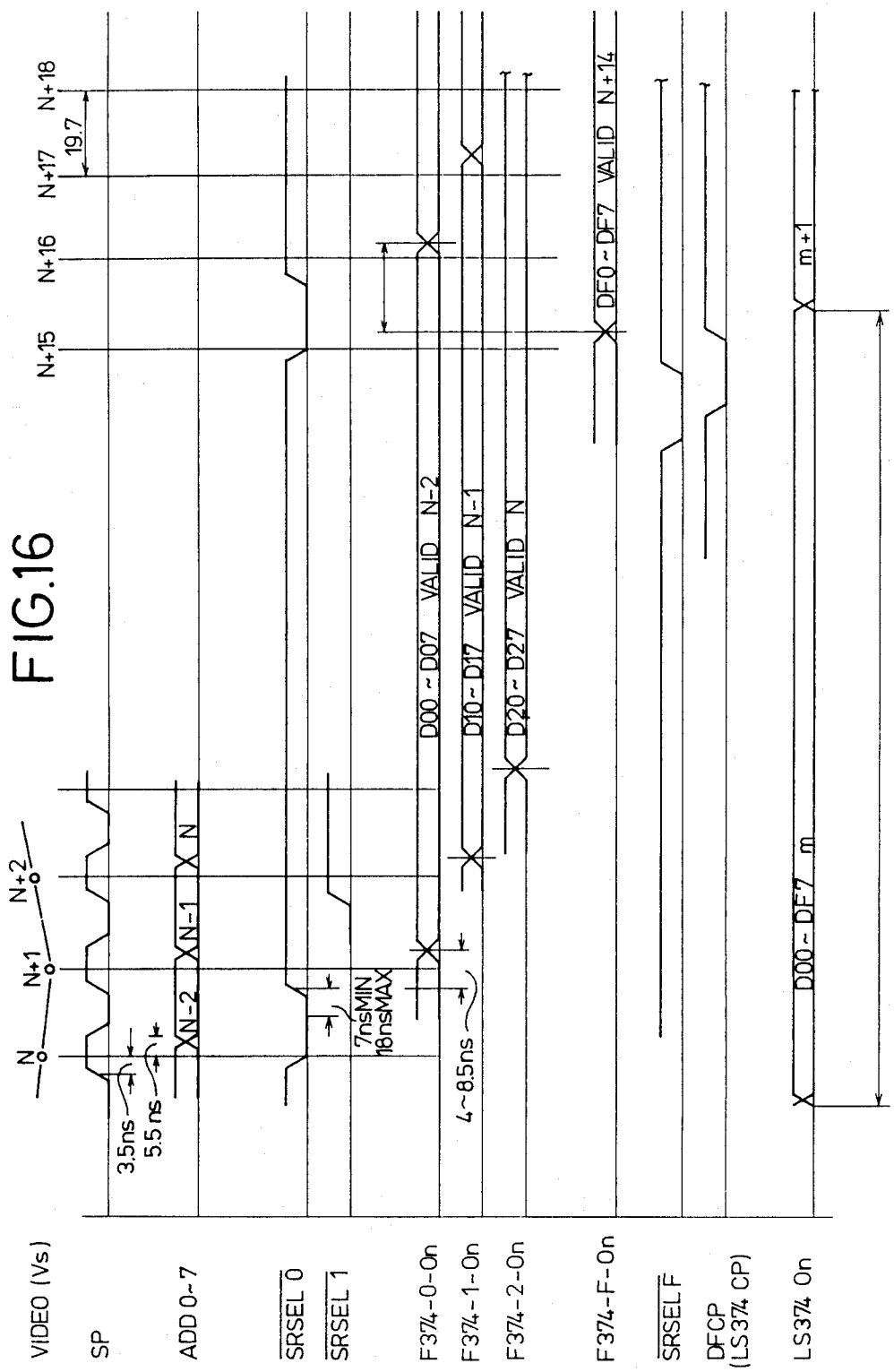

As shown in FIGS. 15 and 16, the output signals VFout from the voltage control oscillator 66 are the basic clock signals of the system. FIG. 15 shows the timing of read-out operation from the frame memory 12 in which memory cycle timing is shown in case the value of line address counter is m and the value of row address counter is n. Row address select signal (RAS), column address select counter (CAS) and address select signal (SEL) are timely output so as to match the cycle time of dynamic RAM used as the frame memory. The RAS signal, in this instance, is output at the positive edge of the initial VFout signals, and the CAS signal is output at the third positive edge of the VFout. That is, the CAS signal is output at 54.3 ns later than the time of the output of the RAS signal. The SEL signal and the CAS signal are output at the same time so that the address signals A0 to A7 are switched to column signals from row signals. In the present example, read-out data become effective at the time of 150 ns later than the negative edge of the RAS signal.

FIG. 16 shows a timing chart where the write timing of the A/D converted signals into the frame memory is illustrated. The image signals at each clock signal of VFout signals are sampled such as N, N+1, N+2, ..., and the A/D converted output signals ADD0-ADD7 are obtained at two clocks later. The A/D converted signals 0-7 are latched by one of 16 D-type flop-flops (F374) in accordance with signals SRSELn. Thus, all data of 16 D-type flip-flops (F374) become effective at the time of N+15 as shown in FIG. 16 and these data are latched in the 16 D-type flip-flops (F374). The writing operation of the image data latched in the LS374 into the frame memory is similar to the above reading operation and, therefore, detailed explanation in this regard will be omitted.

When the composite video signal Si is applied to the video image storing apparatus, only a video signal is supplied by the horizontal/vertical synchronizing pulse remover 44 as VIDEO ($V_S$) to the A/D converter 47. The video signal VIDEO ($V_S$) is converted to a digital signal on a real-time basis per sampling pulse SP, and the digital signal ADD0-ADD7 is applied from the A/D converter 47 to the S/P converter 48. The output timing of the sampling pulses SP is controlled by the frequency synthesizer 28 in the synchronizing signal generating circuit 16. The composite video signal Si is separated by the sync. separator 46 into the C.SYNC signal and the V.SYNC, as described above, which are applied to the selector 52. In response to the conduction of the write switch 58, the write timing circuit 56 provides output timing for the V.SYNC signal from the selector 52.

As described above, the C.SYNC signal or the H.SYNC signal from the selector 52 is supplied to the phase comparator 64 after equalizing pulses are removed therefrom by the equalizing pulse remover 24 controlled by the F/V converter 22. The output signal from the phase comparator 64 is supplied to the VCO 68 through the LPF 66, and multiplied by N to produce sampling pulses SP. The sampling pulses SP are then frequency-divided by the modulo-N frequency divider 80 controlled by the microcomputer 82 such that the number of sampling pulses required in an image will be a desired number (e.g., 1024), and the frequency-divided pulses are then fed back to the phase comparator 64. The period of the fed-back sampling pulses SP is brought into synchronism with the period of the H.SYNC signal.

Figure 17:
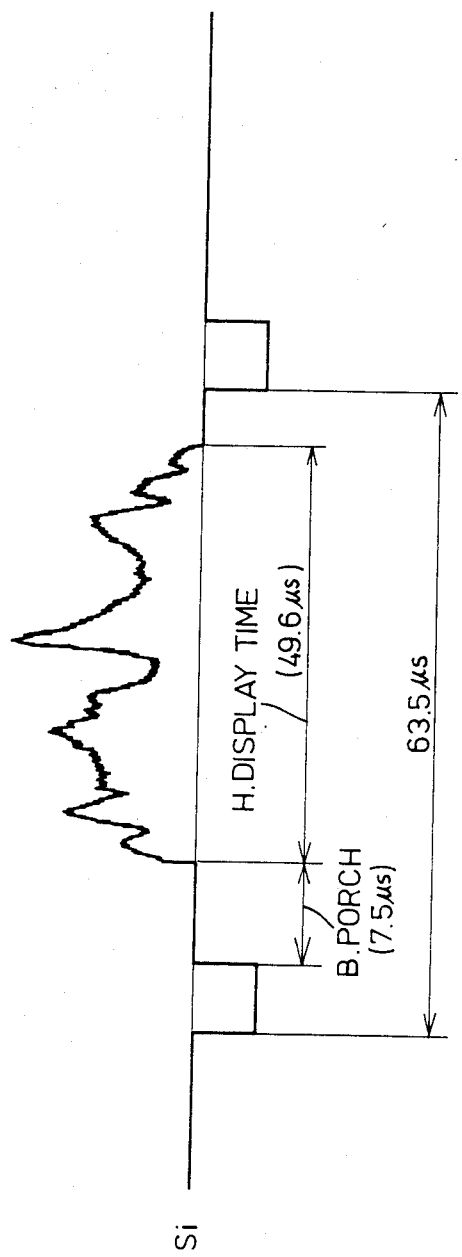
FIG. 17 is a diagram showing a waveform of a video signal.

An example of calculation of the number of sampling pulses SP per line will be described with reference to an actual video signal Si as shown in FIG. 17.

A video signal portion (horizontal display time) which is of 49.6 us is converted to a digital signal with 1024 sampling pulses. Therefore, the interval between adjacent ones of the sampling pulses SP is 48.4 ns (49.6 us/1024). The number of sampling pulses per line can be determined by the following equation:

$$63.5 \text{ us}/48.4 \text{ ns} = 1312$$

By putting this in the above equation (1), the number of sampling pulses per line can be expressed as follows:

$$1312 \text{ (N)} = 1024 \text{ (A)} + 288 \text{ (B)}.$$

The data ADD0-ADD7 from the A/D converter 47 are applied to the S/P converter 48, and stored via the register 50 successively into the frame memory 12 per frame based on the signals SRSEL0-SRSELF from the decoder 74. At this time, the data are stored into the frame memory 12 at the timing of the signal DFCP which is slightly delayed from SRSELF. The frame memory 12 is addressed by selecting one of the output signals D, E of the address counters 70, 84 with the signal SEL from the frame memory timing circuit 86 to enable the selector 78 to switch between horizontal and vertical addresses. The video signal can thus be stored on a real-time basis according to the aforesaid procedure.

A video image stored in the frame memory 12 can be displayed on a display unit such as a CRT as follows: The image signal stored in the frame memory 12 is supplied to the shift register 85 under a command from the microcomputer 82, and then converted by the D/A converter 72 to the video output analog signal $S_{AO}$. The number of scanning lines of the video output analog signal $S_{AO}$ corresponds to the number of scanning lines predetermined by the display unit such as a CRT which is provided according to the input H.SYNC and V.SYNC signals from the video generator which correspond to the video signal. Thus, a video image composed of a different number of scanning lines can clearly be displayed without being governed by the number of scanning lines of the input video signal Si. For issuing the signal stored in the frame memory 12 as a digital form, the video output digital signal $S_{DO}$ may be issued through the data register 86 and the digital interface 88.

While the value of N in the modulo-N frequency divider 60 is determined by the equation: $N = A + B$ in the foregoing embodiments, it may be determined according to the equation (5) if the period of sampling pulses per line of the sampled video signal may be a desired period.

An example of calculating the number of sampling pulses for the video signal shown in FIG. 17, using the equation (5), is as follows:

$$[63.5 \ \mu s/47.0 \ ns] = 1351$$

where 47.0 ns is the period of sampling clocks of output video signals of signal sources. Through such a setting, beating due to the difference between the output period of the video signal and the sampling period of the A/D converter 47 can be prevented from occurring. For example, bits of a periodic pattern and a letter such as "A" are not displayed in a distorted fashion.

Figure 18:
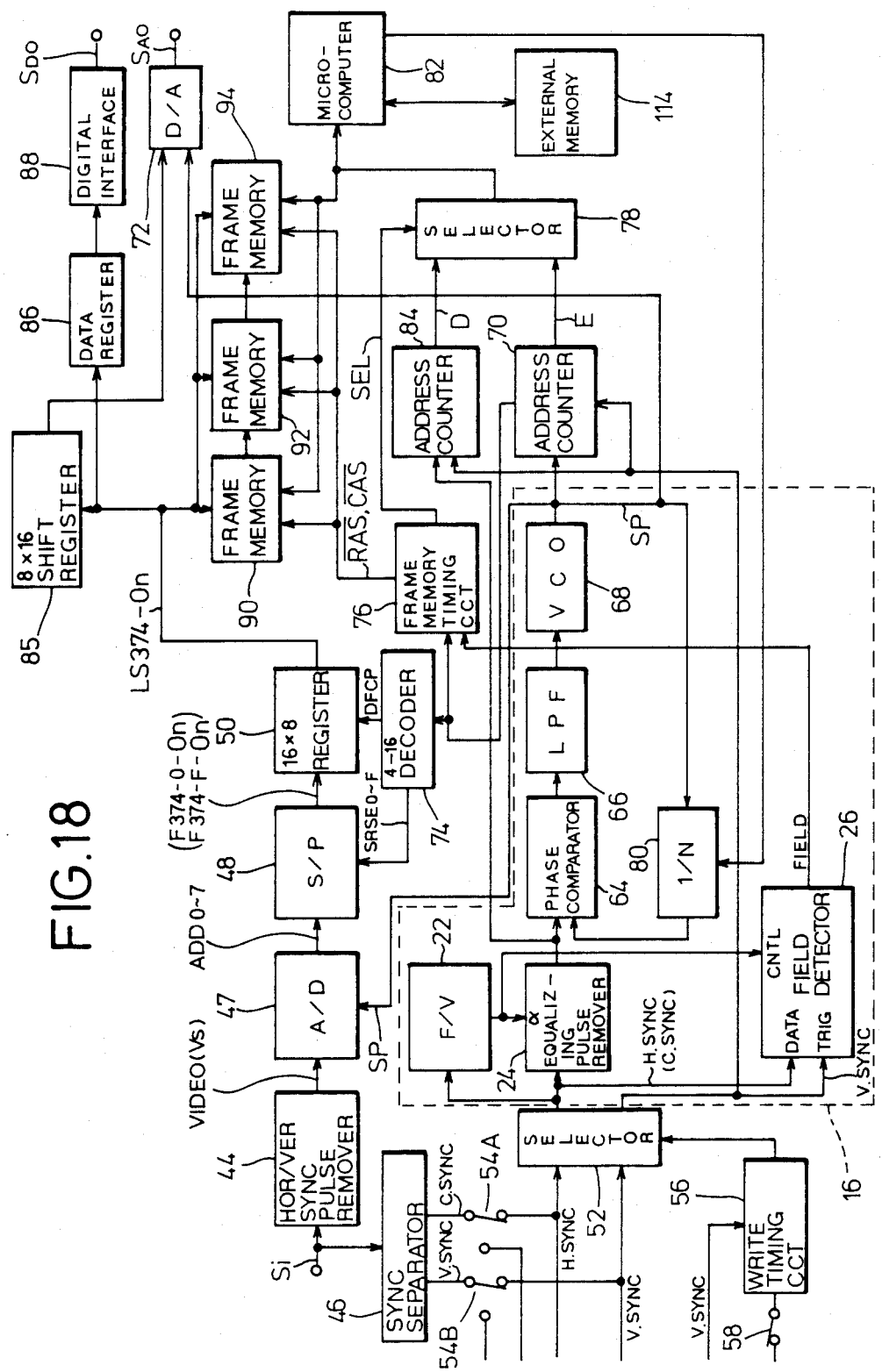
FIG. 18 is a detailed block diagram of an image storing apparatus according to another embodiment of the present invention which incorporates the synchronizing signal generating circuit of the present invention.

FIG. 18 shows an image storing apparatus according to a second embodiment which incorporates the synchronizing signal generating circuit 16 of the present invention. The overall image storing apparatus of the second embodiment is substantially the same as the image storing apparatus of the first embodiment. Therefore, those parts which are identical to those of the first embodiment are denoted by identical reference numerals, and will not be described in detail.

As shown in FIG. 18, the output signal from the register 50 is applied to frame memories 90, 92, 94. The frame memories 90, 92, 94 are supplied with a control signal from the microcomputer 82 to freely select a storage location for the video signal from the three frame memories 90, 92, 94.

The output signal from the frame memories 90, 92, 94 is supplied to the shift register 85. The signal from the shift register 85 is issued via the D/A converter 72 as the video analog signal $S_{AO}$. The output signal from the frame memories 90, 92, 94 is issued via the data register 86 and the digital interface 88 as the video digital signal $S_{DO}$. With this arrangement, the input video signal Si is stored in any one of the frame memories 90, 92, 94 by the control signal from the microcomputer 82. The microcomputer 82 can determine how the video signals are stored in the frame memories 90, 92, 94 for simultaneously executing the input and output of video signals.

Therefore, input signals which are even composed of different numbers of scanning lines can separately be stored in the same image storing apparatus. Moreover, the number of scanning lines can be changed to a desired number of scanning lines, and output signals suited to various different output devices (such as a laser printer) can be issued. The image storing apparatus may therefore be used as a so-called image buffer.

The N-multiplier or the frequency synthesizer 28 controlled by the F/V converter 22 in the synchronizing signal generating circuit 16 of the invention will now be described in detail with reference to the accompanying drawings. Those parts which are identical to those of the field discriminating circuit (see FIG. 2) controlled by the F/V converter 22 in the N-multiplier controlled by the F/V converter 22 are denoted by identical reference numerals and will not be described in detail.

Figure 19:
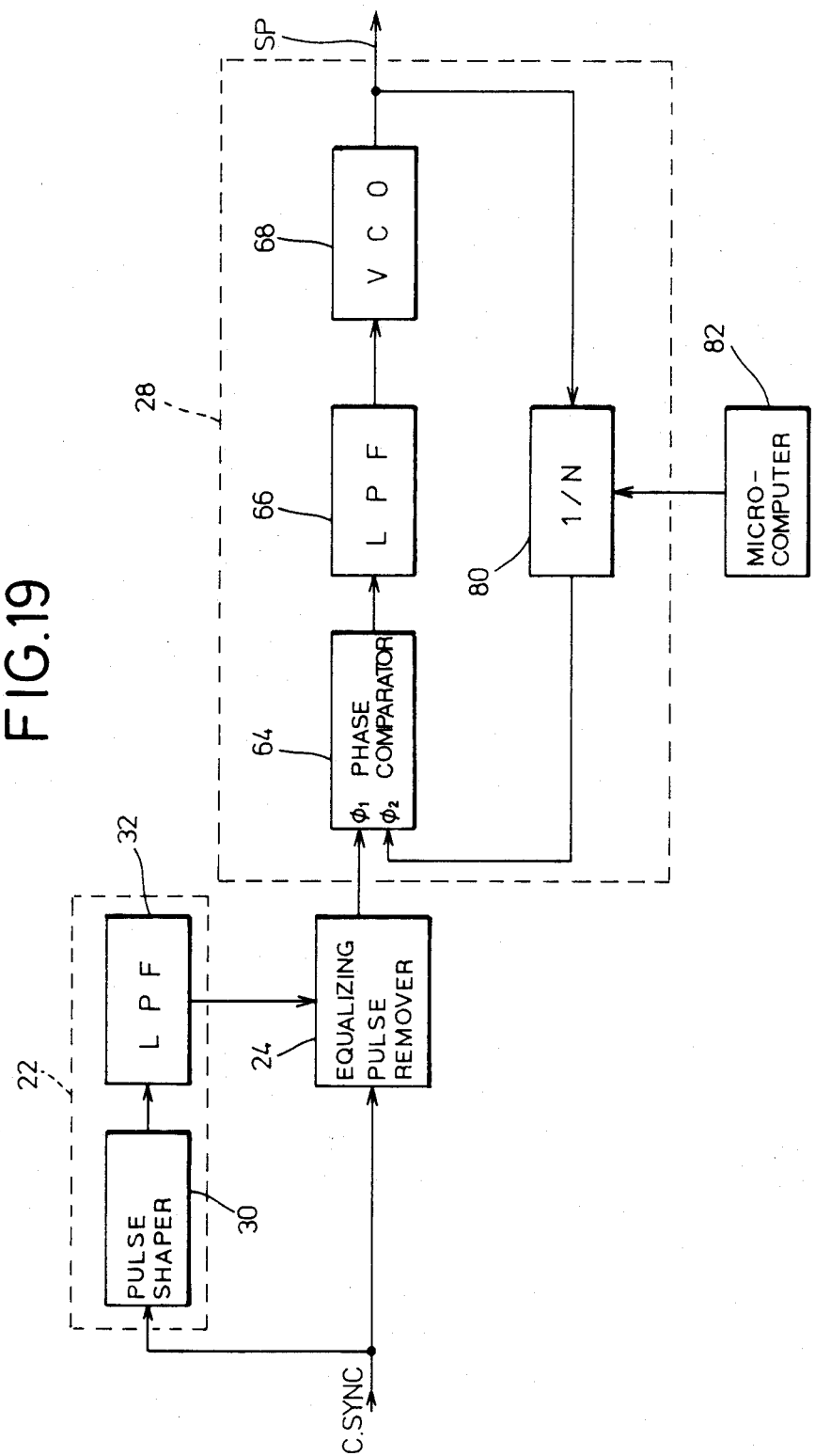
FIG. 19 is a detailed block diagram of an N-multiplying circuit controlled in an F/V converter in the synchronizing signal generating circuit of the present invention.

FIG. 19 shows an N-multiplier which is controlled by the F/V converter 22. The N-multiplier controlled by the F/V converter 22 is basically composed of the F/V converter 22, the equalizing pulse remover 24, and the frequency synthesizer 28 with its frequency-dividing ratio N being programmable. The equalizing pulse remover 24 comprises a monostable multivibrator in which the time constant is set to $\frac{3}{4} T_H$ ($T_H$ is the period of a horizontal synchronizing signal). The time constant is set to $\frac{3}{4} T_H$ because even if the positions where equalizing pulses are inserted are shifted, they will not exceed an intermediate value between 1H and $\frac{1}{2} T_H$.

The C.SYNC signal including equalizing pulses applied to the N-multiplier is applied to the equalizing pulse remover 24, and also to the time constant control terminal $\alpha$ of the equalizing pulse remover 24 through the pulse shaper 30 and the LPF 32 of the F/V converter 22. The output signal from the equalizing pulse remover 24, i.e., the C.SYNC signal is applied to a reference input terminal $\phi_1$ of the phase comparator 64 of the frequency synthesizer 28. The output signal from the phase compartor 64 is applied via the LPF 66 and the VCO 68 to the modulo-N frequency divider 80 with its frequency-dividing ratio N being controlled by the microcomputer 82. The output signal from the frequency divider 80 is fed to a second signal input terminal $\phi_2$ of the phase comparator 64.

The output terminal of the VCO 68 which is joined to the modulo-N frequency divider 80 produces sampling pulses SP which are employed as sampling pulses for the A/D converter 47 and the like.

Figure 20:
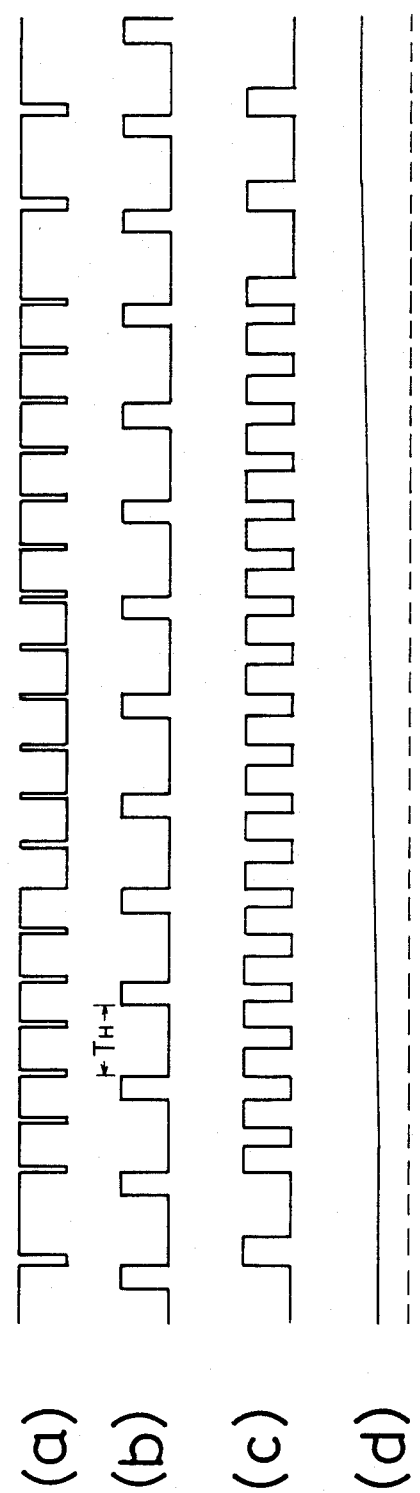
FIG. 20 is a waveform diagram explaining operation of the N-multiplying circuit controlled by the F/V converter shown in FIG. 19.

The applied input composite synchronizing signal, i.e., the C.SYNC signal is of a waveform as shown in FIG. 20 at (a). This waveform includes a horizontal synchronizing signal, a vertical synchronizing signal, and equalizing pulses, as described above.

The monostable multivibrator of the equalizing pulse remover 24 is triggered by negative-going edges of the C.SYNC signal shown in FIG. 20(a) to remove equalizing pulses and serrated pulses inserted at the positions of $\frac{1}{2}$ H. Therefore, the waveform of the output signal from the equalizing pulse remover 24 has pulse intervals of 1 $T_H$ as shown in FIG. 20(b). This is because the time constant of the monostable multivibrator of the equalizing pulse remover 24 is set to $\frac{3}{4} T_H$.

Since the output signal of the F/V converter 22 is applied to the time constant control terminal of the equalizing pulse remover 24 through the pulse shaper 30 and the LPF 32, the equalizing pulses can be removed even if a horizontal synchronizing frequency (fh) contained in the C.SYNC signal applied has a different period, i.e., the equalizing pulses can be removed from output signals having different numbers of scanning lines which are issued from diagnostic apparatus. The output signal from the pulse shaper 30 is shown in FIG. 20(c), and the output signal from the LPF 32 is shown in FIG. 20(d).

The output waveform of the time constant control signal shown in FIG. 20(d) has its voltage increased in the vicinity of an area where equalizing pulses are present in the C.SYNC signal. The increase in the voltage due to the presence of the equalizing pulses has substantially no effect on the action to remove equalizing pulses according to the present invention. The reason for this is that if 18 equalizing pulses, i.e., a time 9 $T_H$, for example, is provided for 500 scanning lines, i.e., a time 500 $T_H$, for example, in one field, then 9 H/500 H $\times$ 100 = 1.8%, and this level poses substantially no problem in view of the fact that the time constant of the equalizing pulse remover 24 may range within $\frac{3}{4} T_H \pm \frac{1}{4} T_H$.

The time constant of the equalizing pulse remover 24 is controlled by the F/V converter 22 in a feed-forward loop. Therefore, high-speed and stable control operation is achieved.

The output horizontal synchronizing signal from the equalizing pulse remover 24 is applied to the reference input terminal $\phi_1$ of the phase comparator 64 in the frequency synthesizer 28. The modulo-N frequency divider 60 with its frequency-dividing ratio N being predetermined for a diagnostic apparatus used by the LPF 66, the VCO 68, and the microcomputer 82, applies a signal having a frequency which is N times as high as the frequency of the applied horizontal synchronizing signal. The N-multiplied signal can be brought into accurate synchronism with the input signal by the frequency synthesizer 28. As described before, the N-multiplied signal is used as sampling pulses SP for the A/D converter 47 of the image storing apparatus.

Figure 21:
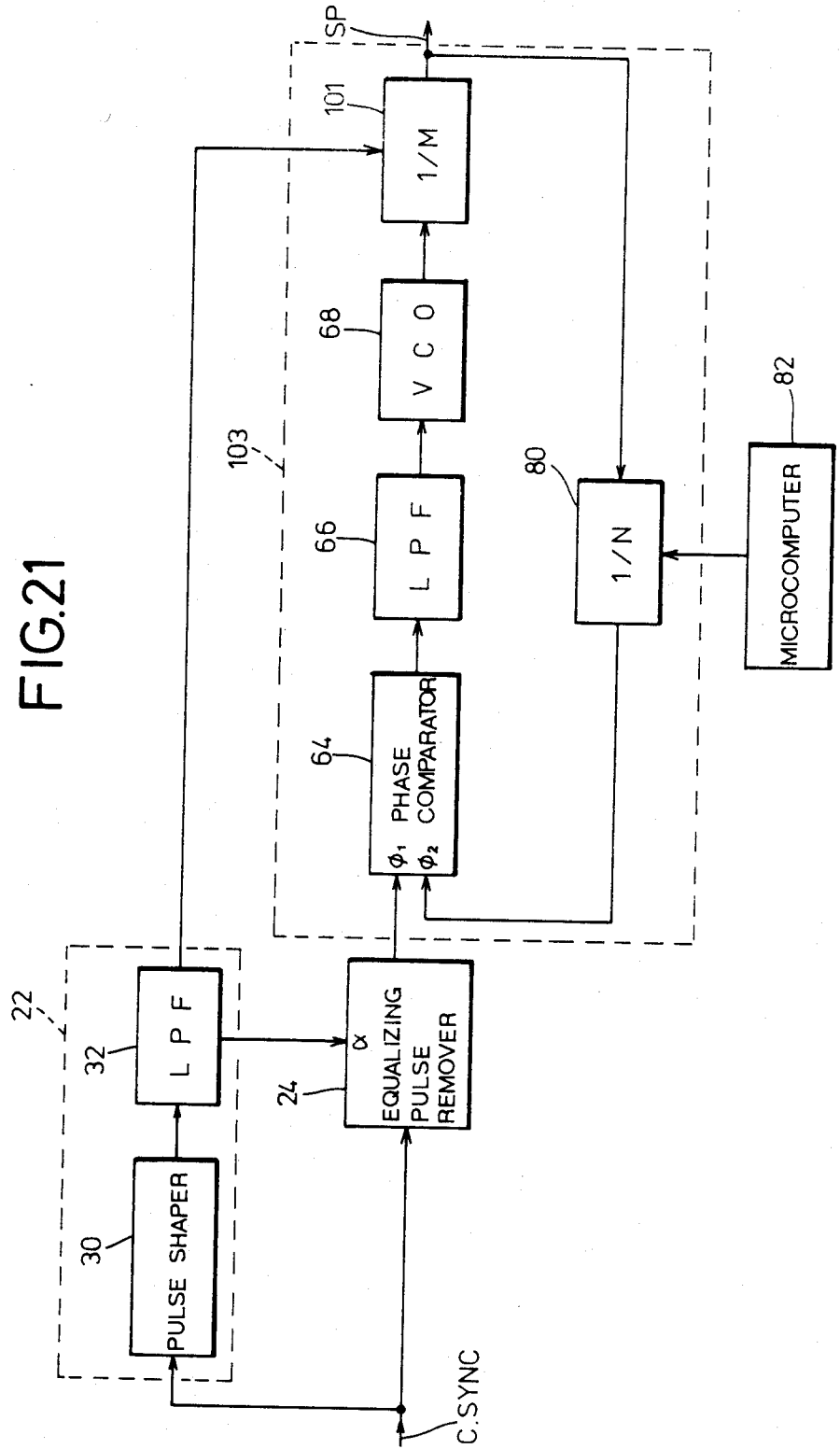
FIG. 21 is a block diagram of an N-multiplying circuit according to still another embodiment of the present invention which is controlled by the F/V converter shown in FIG. 19.

The circuit shown in FIG. 19 for generating sampling pulses, i.e, the N-multiplier, receives composite synchronizing signals having different numbers of scanning lines from various diagnostic apparatus for generating sampling pulses for such composite synchronizing signals. The actual number of scanning lines often varies from 500 to 1000. Therefore, as shown in FIG. 21, a prescaler 101 having a frequency-dividing ratio M may be inserted between the VCO 68 and the modulo-N frequency divider 80, and the frequency-dividing ratio M of the prescaler 101 may automatically be controlled at 1 or 2 by the output signal from the F/V converter 22. This arrangement is advantageous for the following two reasons:

(1) Since the performance of the programmable frequency divider which is most difficult to become higher in speed and frequency in the frequency synthesizer can be lowered, the critical point of the overall apparatus can be raised, with the result that the apparatus can have a higher processing speed.

(2) The oscillation frequency of the VCO is kept at a substantially constant level to increase the stability of the system, and the oscillation band is narrowed to make it unnecessary to replace externally attached parts of the CCO.

Figure 22:
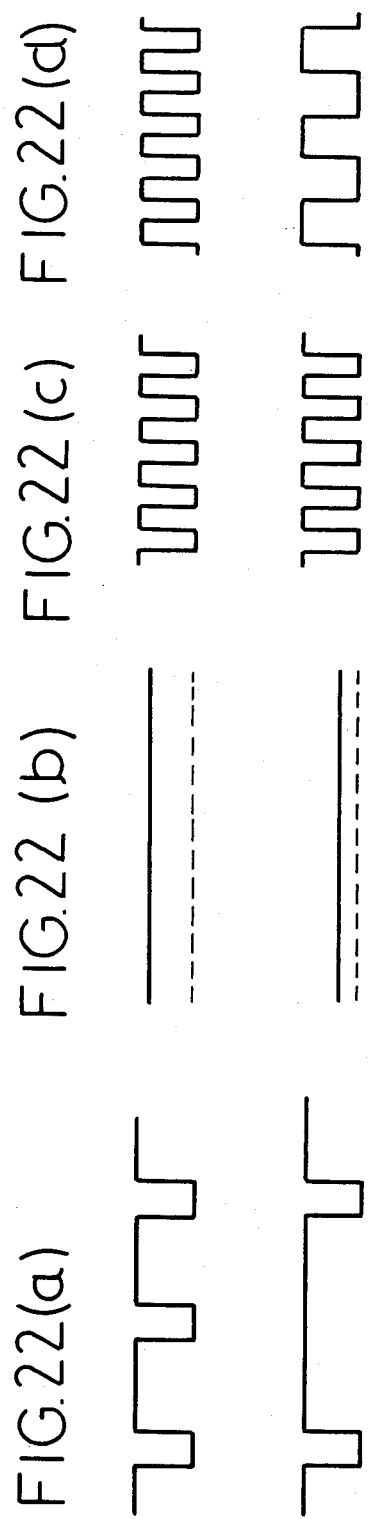
FIGS. 22a through 22d are waveform diagrams illustrative of operation of an N-multiplying circuit according to a further embodiment of the present invention which is controlled by the F/V converter shown in FIG. 21.

FIG. 22 shows at (a) through (d) the waveforms of various signals produced when the horizontal synchronizing signal contained in the H.SYNC signal is varied about twice greater in period. The upper waveforms are produced before the horizontal synchronizing signal is varied, and the lower waveforms are produced after the horizontal synchronizing signal is varied. FIG. 22(a) shows the H.SYNC signals, FIG. 22(b) the output signals from the F/V converter 22, FIG. 22(c) the output signals from the VCO 68, and FIG. 22(d) the output signals from the prescaler 101, i.e, the signals applied as sampling pulses SP to the A/D converter 27.

Figure 23:
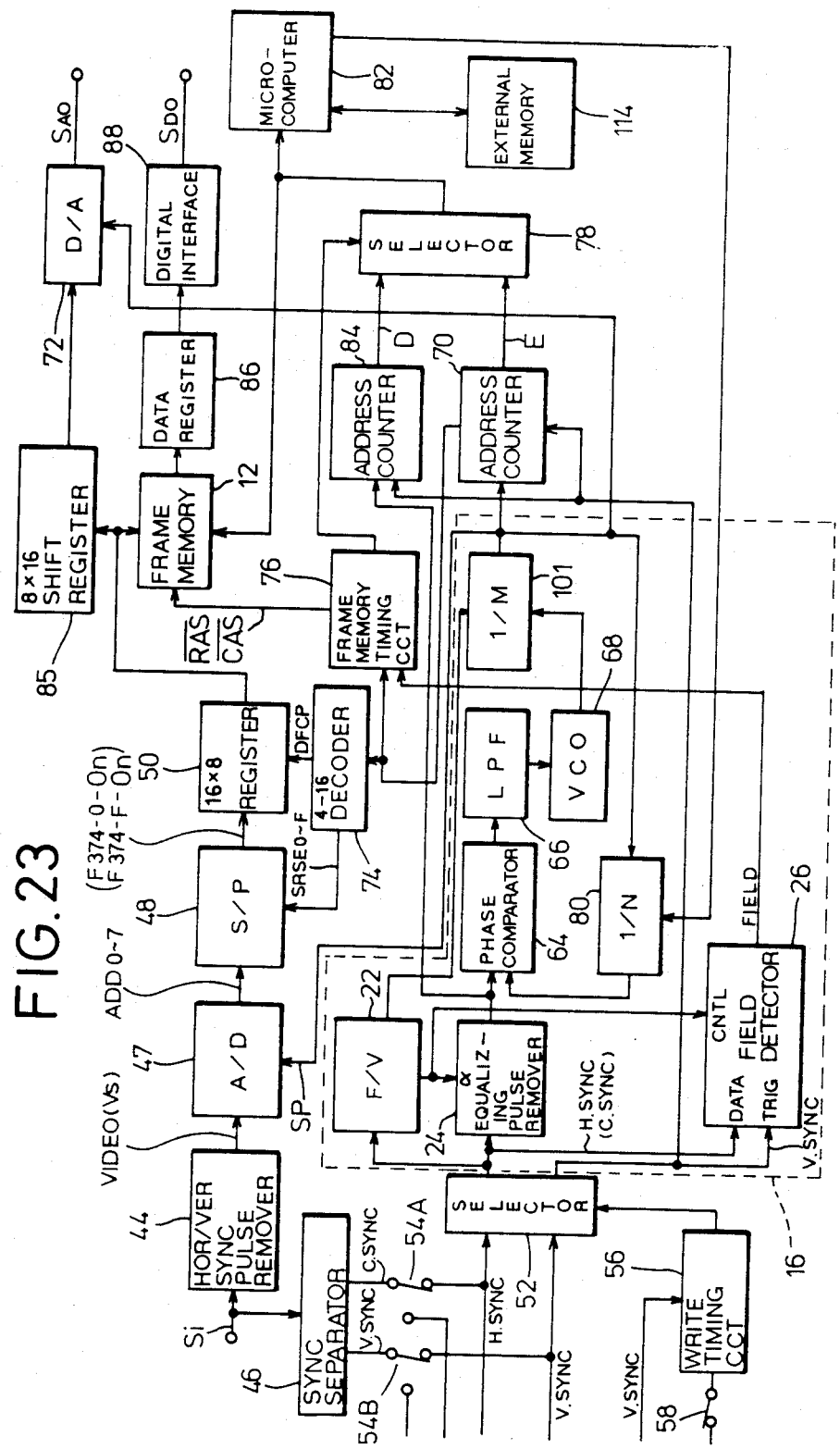
FIG. 23 is a detailed block diagram of an image storing apparatus including an N-multiplying circuit according to a still further embodiment of the present invention which is controlled by the F/V converter shown in FIG. 21.

As can readily be seen from FIG. 22, the frequency-dividing ratio M of the prescaler 101 in the frequency synthesizer 28 serving as the sampling pulse generator in the synchronizing signal generating circuit of the present invention is automatically varied by the output signal, shown in FIG. 22(b), from the F/V converter 22. Therefore, it is possible to keep the output frequency of the VCO 68 at a substantially constant level. The overall image storing apparatus including the prescaler 101 is shown in detailed block form in FIG. 23.

Figure 24A:
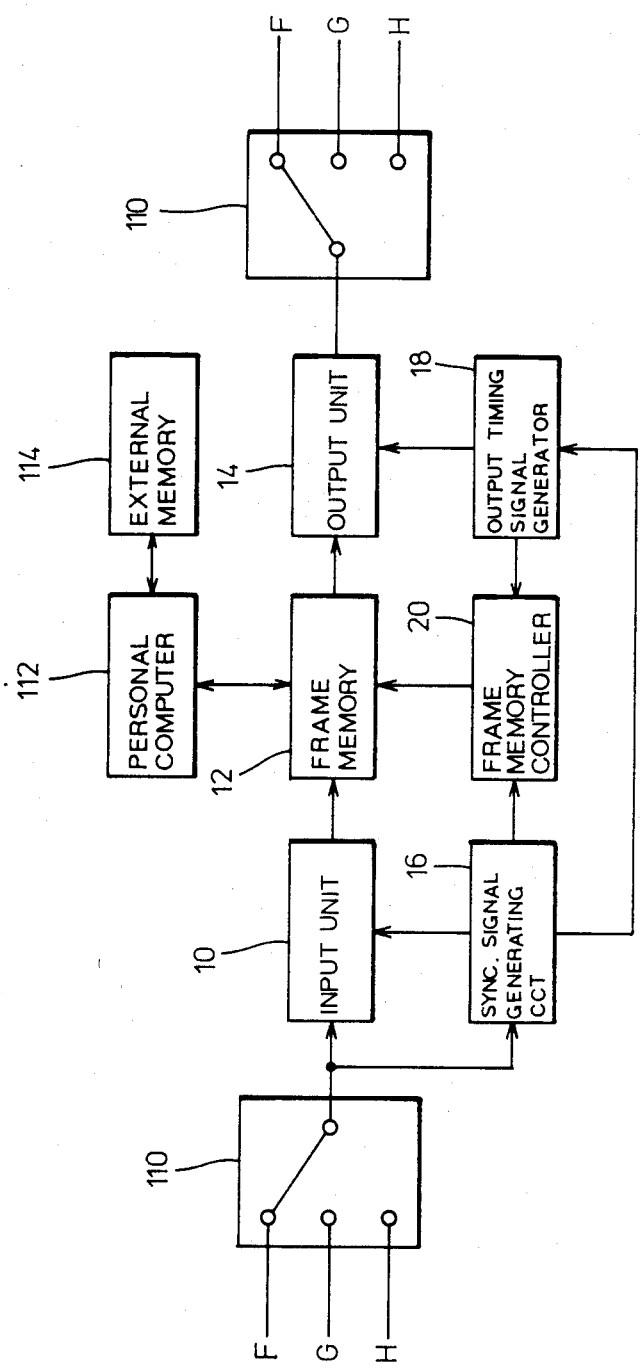

FIG. 24A shows an image storing apparatus employing the synchronizing signal generating circuit of the invention, where video signals F, G, H of different numbers of scanning lines are applied.

The video signals F, G, H of different numbers of scanning lines are selectively applied through a selector 110 and converted to a digital signal by the input unit 10 according to a timing signal (sampling pulses) generated by the synchronizing pulse generating circuit 16. The digital signal is then stored in the frame memory 12 based on a field discriminating signal FIELD applied by the field detector 26. The output unit 14 is controlled by the output timing signal generator 18. Where the output unit 14 is composed of a D/A converter, a still image can be reproduced on a CRT monitor (not shown) on a real-time basis according to the above procedure. Video information may temporarily be stored in an external memory 114 such as a floppy disc through a personal computer 112, and the output signal from a video generator (not shown) may be used as an input video signal to produce an output timing signal for transferring the video information from the floppy disc into the frame memory 12. With this arrangement, diagnostic images can be visually checked for various forms of image evaluation in places where no diagnostic apparatus is available. The output signal of the video generator may be the same as the input signal thereof.

Figure 24B:
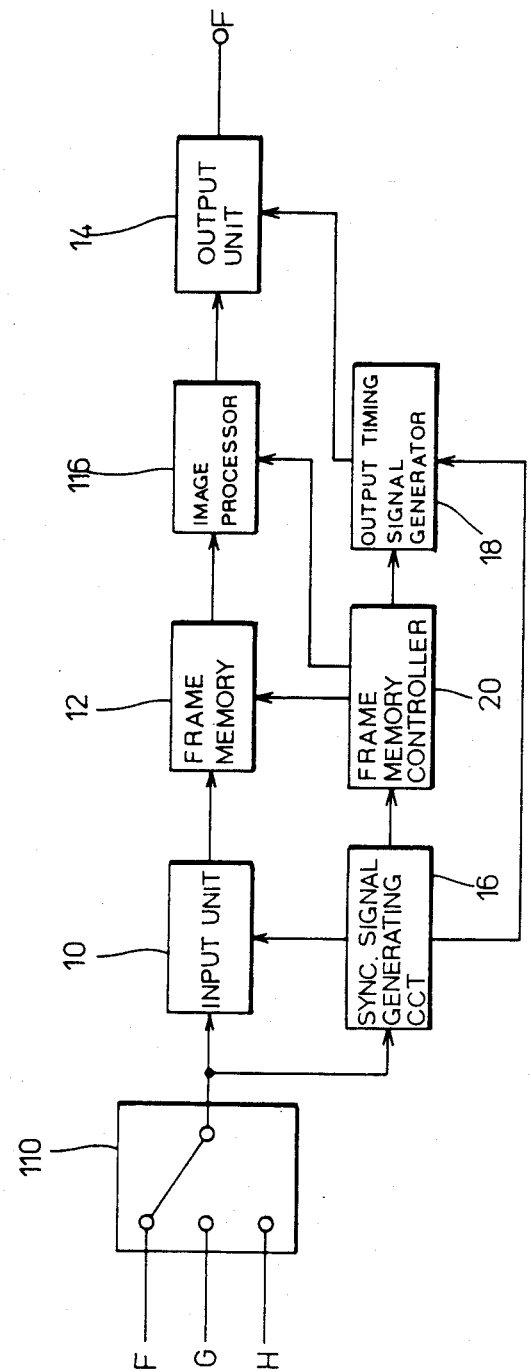

Another image storing apparatus which is a system for converting scanning lines is shown in FIG. 24B. In this embodiment, an image processor 116 is inserted between the frame memory 12 and the output unit 14 and supplied with a signal from the frame memory controller 20. The image processor 116 produces image information by interpolation or skipping as well known in the art, and issues the image information in a single format in the vertical direction of the image at the output timing from the output timing signal generator 18. By normalizing the image information into the same format in the vertical direction of the image produced by a medical laser printer, the speed of auxiliary scanning operation of a scanner in the medical laser printer is not required to be controlled, and the aspect ratio of the image can easily be established.

Where a display CRT is employed in a PACS, such a display CRT may be a CRT monitor using scanning lines of a single kind.

When issuing image information to a CRT multiformat camera, it can be displayed on a CRT monitor using scanning lines of a single kind, and photographs of various diagnostic modalities can be laid out on one film.

FIG. 24C shows an image storing apparatus used as an image collecting system. An image stored in the frame memory 12 is transferred through the output unit 14 into an external memory 114. The external memory 114 may comprise a magnetic disc or a floppy disc in a microcomputer. The signal stored in the external memory 114 can be issued to systems, described below, when required.

Conventional medical laser printers have an image memory, an image processor, a laser beam source, a light modulator, a light scanner, and a storage medium feed mechanism. Signal input means for various diagnostic modalities comprises a digital signal interface. Since a final output with image processing effected to suit a desired purpose is applied to the laser printer, various diagnostic modality devices, and hardware and software of the laser printer are expensive. With the image storing apparatus of the present invention being incorporated, an inexpensive system applicable to all diagnostic modalities can be achieved without modifying the conventional system.

The PACS will be described below. New digital image diagnostic apparatus are being quickly introduced and diversified, whereas image processing systems are becoming higher in performance and lower in price, with high-speed image reading apparatus being rapidly developed. Under these circumstances, a PACS has been developed for the total control of image information. With the image storing apparatus of the invention being used, medical images in different image formats provided by different medical equipment manufacturers are rendered compatible, and a PACS can be composed of existing apparatus. Where the apparatus of the invention is used as such a medical image storage system, it can issue images as required.

Figure 24D:
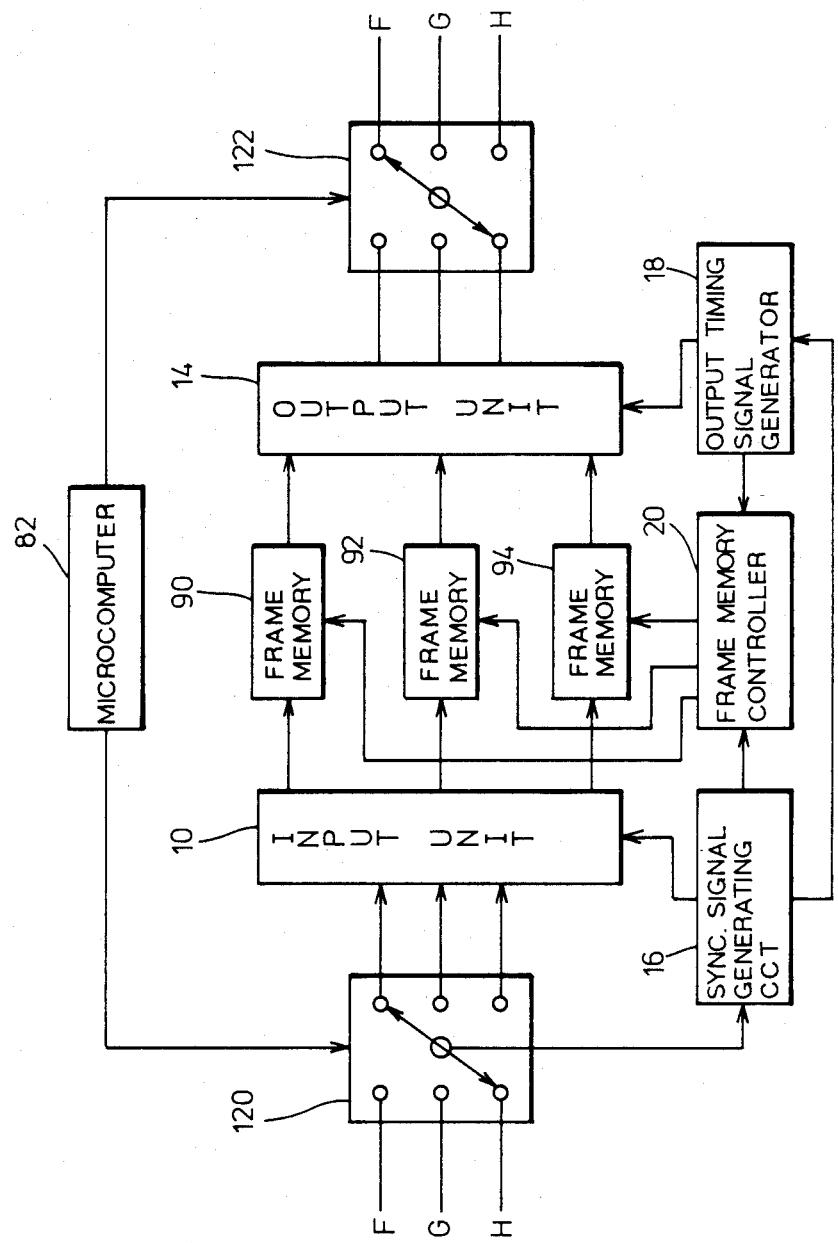

FIG. 24D shows an application for the image storing apparatus having a plurality of frame memories as shown in FIG. 18. As shown, input video signals F, G, H having different numbers of scanning lines are supplied to a selector 120 having three input terminals and three output terminals, and the image signals can selectively be stored into one of the three frame memories 90, 92, 94 through the input unit 10.

At the same time, the output unit 14 can issue an image signal via a selector 122 from a frame memory other than the frame memory in which an image signal is being stored.

The system thus constructed can be used as a so-called image buffer. Such an image buffer can be used in various applications, as described below.

When there are plural diagnostic apparatus (CT, US, DF, and the like) and images obtained thereby are to be photographed by a single multiformat camera, the images could not be photographed if diagnostic data were issued from the plural diagnostic apparatus. The system of the present invention can however store the data and process a plurality of signals. The buffered data can be edited on a single film. More specifically, a diagnostic image of a circulatory organ can be buffered, and only an image required for an operation can be reproduced as a hard copy, or displayed in a multiple frame on a CRT. Moreover, the invention can be applied to a system for receiving and storing an image on a real-time basis and producing a hard copy of only a desired area (affected part) as when an esophagus is observed. The system of the invention may be located in a communication input section as a transmission terminal for data transfer into and out of a hospital, so that image data can be buffered.

With the present invention, as described above, when a plurality of video images composed of different numbers of scanning lines and produced from different imaging devices of various diagnostic apparatus are stored per image frame in an image memory in a single digital image storing apparatus, the time constant of the equalizing pulse remover and the time constant of the field detector are automatically controlled by a control signal from the F/V converter, and the frequency synthesizer including the equalizing pulse remover controlled by the F/V converter is employed to provide the synchronizing signal generating circuit. Therefore, a signal produced by multiplying, by N, a horizontal synchronizing signal which is equal to an input video synchronizing signal with equalizing pulses removed therefrom can be produced as sampling pulses. A field discriminating signal for odd-and even-numbered fields is derived from the composite video signal, and used as an address signal for the image memory in the image storing apparatus, so that the video signals composed of different numbers of scanning lines can accurately be stored per frame in the image memory. Since the time constant of the equalizing pulse remover or the frequency-dividing ratio of the prescaler is controlled in a feed-forward loop, high-speed operation is made possible and images can be processed on a real-time basis. As a result, medical diagnosis can quickly be carried out.

Images stored according to the present invention may be employed in signal sources for various image recording apparatus (a multiformat camera, a laser printer, a thermal printer, an ink jet printer, and the like), input signal sources for PACS files, primary image storage systems for X-ray TV or cinematographic systems, image buffers employing the principles of the image memory, and scan converters.

Although certain preferred embodiments have been shown and described, it should be understood that many changes and modifications may be made therein without departing from the scope of the appended claims.

What is claimed is:

1. A synchronizing signal generating circuit comprising: equalizing pulse remover means for receiving a composite synchronizing signal as an input signal, said equalizing pulse remover means being adapted to be coupled to a reference input terminal of a frequency synthesizer; and an F/V converter for controlling said equalizing pulse remover means, said F/V converter being receptive of said composite synchronizing signal as an input signal.

2. A synchronizing signal generating circuit according to claim 1, wherein said F/V converter receives a video synchronizing signal as the input signal and comprises a pulse shaper and a low-pass filter connected thereto, said equalizing pulse remover means being controlled by an output signal from said low-pass filter.

3. A synchronizing signal generating circuit comprising equalizing pulse remover means for receiving a composite synchronizing signal as an input signal, said equalizing pulse remover means being adapted to be coupled to a reference input terminal of a frequency synthesizer including at least a prescaler; and an F/V converter for producing as an output signal thereof a control signal for controlling said equalizing pulse remover means, said F/V converter being receptive of said composite synchronizing signal as an input signal.

4. A synchronizing signal generating circuit according to claim 3, wherein said F/V converter comprises a pulse shaper and a low-pass filter connected thereto, said equalizing pulse remover means and/or said prescaler being controlled by an output signal from said low-pass filter.

5. A synchronizing signal generating circuit comprising: a field discriminating circuit for deriving a field discriminating signal from a composite synchronizing signal relative to a plurality of composite video signals having different numbers of scanning lines and produced from different video output devices; an F/V converter; an equalizing pulse remover and a vertical synchronizing signal separator which are controlled by said F/V converter, said F/V converter, said equalizing pulse remover, and said vertical synchronizing signal separator being receptive of the composite synchronizing signal; and a field detector including at least one delay flip-flop means and having a data input terminal connected to an output terminal of said equalizing pulse remover, a trigger input terminal connected to an output terminal of said vertical synchronizing signal separator, and a time constant control terminal connected to an output terminal of said F/V converter; said field discriminating circuit being arranged such that at a time or during a time period upon elapse of a time period from a prescribed leading edge of a rectangular-wave output signal from said vertical synchronizing signal separator, said field detector determines the binary level of an output signal applied by said equalizing pulse remover to said data input terminal for deriving the field discriminating signal of either a high level or a low level.

6. A synchronizing signal generating circuit according to claim 5, wherein said field detector substantially comprises monostable multivibrator means and D-type flip-flop means, said monostable multivibrator means having a trigger input terminal supplied with an output signal from said vertical synchronizing signal separator, a time constant control terminal supplied with an output signal from said F/V converter, and an output terminal connected to a clock input terminal of said D-type flip-flop means, said D-type flip-flop means having a data input terminal supplied with an output signal from said equalizing pulse remover for deriving an output signal from said D-type flip-flop means as the field discriminating signal.

7. A synchronizing signal generating circuit according to 5, wherein said field detector comprises first monostable multivibrator means, second monostable multivibrator means, D-type flip-flop means, and negative logic AND gate means, said first monostable multivibrator means having a trigger input terminal supplied with an output signal from said vertical synchronizing signal separator, a time constant control terminal supplied with an output signal from said F/V converter, and an output terminal for applying an output signal to a trigger input terminal of said second monostable multivibrator means, said second monostable multivibrator means having an output terminal for applying a positive output signal to a clock input terminal of said D-type flip-flop means and another output terminal for applying a negative output signal to one input terminal of said negative logic AND gate means, said negative logic AND gate means having another input terminal supplied with an output signal from said equalizing pulse remover, and an output terminal for applying an output signal to a set input terminal of said D-type flip-flop means, said D-type flip-flop means having a data input terminal supplied with a negative output signal from said D-type flip-flop means as the field discriminating signal.

8. A synchronizing signal generating circuit comprising: a field discriminating circuit for deriving a field discriminating signal from a composite synchronizing signal relative to a plurality of composite video signals having different numbers of scanning lines and produced from different video output devices; a frequency synthesizer for multiplying a horizontal synchronizing signal based on said composite synchronizing signal; an F/V converter; an equalizing pulse remover and a vertical synchronizing signal separator which are controlled by said F/V converter, said F/V converter, said equalizing pulse remover, and said vertical synchronizing signal separator being receptive of the composite synchronizing signal; and a field detector including at least one delay flip-flop means and having a data input terminal connected to an output terminal of said equalizing pulse remover, a trigger input terminal connected to an output terminal of said vertical synchronizing signal separator, and a time constant control terminal connected to an output terminal of said F/V converter; said field discriminating circuit being arranged such that at a time or during a time period upon elapse of a time period from a prescribed leading edge of a rectangular-wave output signal from said vertical synchronizing signal separator, said field detector determines the binary level of an output signal applied by said equalizing pulse remover to said data input terminal for deriving the field discriminating signal of either a high level or a low level, the arrangement being such that an output signal from said equalizing pulse remover is applied to a reference input terminal of said frequency synthesizer to enable the frequency synthesizer to produce from an output terminal thereof a signal that is obtained by multiplying the horizontal synchronizing signal.

9. A synchronizing signal generating circuit comprising: a field discriminating circuit for deriving a field discriminating signal from a composite synchronizing signal relative to a plurality of composite video signals having different numbers of scanning lines and produced from different video output devices; a frequency synthesizer including at least a prescaler for multiplying a horizontal synchronizing signal based on said composite synchronizing signal; an F/V converter; an equalizing pulse remover and a vertical synchronizing signal separator which are controlled by said F/V converter, said F/V converter, said equalizing pulse remover, and said vertical synchronizing signal separator being receptive of the composite synchronizing signal; and a field detector including at least one delay flip-flop means and having a data input terminal connected to an output terminal of said equalizing pulse remover, a trigger input terminal connected to an output terminal of said vertical synchronizing signal separator, and a time constant control terminal connected to an output terminal of said F/V converter; said field discriminating circuit being arranged such that at a time or during a time period upon elapse of a time period from a prescribed leading edge of a rectangular-wave output signal from said vertical synchronizing signal separator, said field detector determines the binary level of an output signal applied by said equalizing pulse remover to said data input terminal for deriving the field discriminating signal of either a high level or a low level, the arrangement being such that an output signal from said equalizing pulse remover is applied to a reference input terminal of said frequency synthesizer and an output signal from said F/V converter is applied as a control signal as said prescaler to enable the prescaler to produce from an output terminal of said frequency synthesizer a signal that is obtained by multiplying the horizontal synchronizing signal.

* * * * *